United States Patent
Sinyavskiy et al.

(10) Patent No.: US 9,489,623 B1
(45) Date of Patent: Nov. 8, 2016

(54) APPARATUS AND METHODS FOR BACKWARD PROPAGATION OF ERRORS IN A SPIKING NEURON NETWORK

(71) Applicant: Brain Corporation, San Diego, CA (US)

(72) Inventors: Oleg Sinyavskiy, San Diego, CA (US); Vadim Polonichko, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 486 days.

(21) Appl. No.: 14/054,366

(22) Filed: Oct. 15, 2013

(51) Int. Cl.
*G06N 3/08* (2006.01)
*B25J 9/16* (2006.01)

(52) U.S. Cl.
CPC ............... *G06N 3/084* (2013.01); *B25J 9/163* (2013.01); *Y10S 901/50* (2013.01)

(58) Field of Classification Search
None
See application file for complete search history.

(56) References Cited

U.S. PATENT DOCUMENTS

| | | |
|---|---|---|
| 5,063,603 A | 11/1991 | Burt |
| 5,092,343 A | 3/1992 | Spitzer et al. |
| 5,136,687 A | 8/1992 | Edelman et al. |
| 5,138,447 A | 8/1992 | Shen et al. |
| 5,216,752 A | 6/1993 | Tam |
| 5,245,672 A | 9/1993 | Wilson et al. |
| 5,272,535 A | 12/1993 | Elabd |
| 5,355,435 A | 10/1994 | DeYong et al. |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola et al. |
| 5,673,367 A | 9/1997 | Buckley |
| 5,802,506 A | 9/1998 | Hutchison |

(Continued)

FOREIGN PATENT DOCUMENTS

| | | |
|---|---|---|
| CN | 102226740 A | 10/2011 |
| EP | 1089436 A2 | 4/2001 |

(Continued)

OTHER PUBLICATIONS

Bohte, S.M. et al. (2000). "Error-backpropagation in temporally encoded networks of spiking neurons". Centrum voor Wiskunde en Informatica. pp. 17-37. DOI:10.1016/S0925-2312(01)00658-0.*

(Continued)

*Primary Examiner* — Stanley K Hill
*Assistant Examiner* — Benjamin Buss
(74) *Attorney, Agent, or Firm* — Gazdzinski & Associates, PC

(57) ABSTRACT

Apparatus and methods for developing robotic controllers comprising parallel networks. In some implementations, a parallel network may comprise at least first and second neuron layers. The second layer may be configured to determine a measure of discrepancy (error) between a target network output and actual network output. The network output may comprise control signal configured to cause a task execution by the robot. The error may be communicated back to the first neuron layer in order to adjust efficacy of input connections into the first layer. The error may be encoded into spike latency using linear or nonlinear encoding. Error communication and control signal provision may be time multiplexed so as to enable target action execution. Efficacy associated with forward and backward/reverse connections may be stored in individual arrays. A synchronization mechanism may be employed to match forward/reverse efficacy in order to implement plasticity.

30 Claims, 14 Drawing Sheets

(56) References Cited

U.S. PATENT DOCUMENTS

| | | |
|---|---|---|
| 5,875,108 A | 2/1999 | Hoffberg et al. |
| 5,997,539 A | 12/1999 | Errico et al. |
| 6,009,418 A | 12/1999 | Cooper |
| 6,014,653 A | 1/2000 | Thaler |
| 6,020,953 A | 2/2000 | Barrows |
| 6,035,389 A | 3/2000 | Grochowski et al. |
| 6,169,981 B1 | 1/2001 | Werbos |
| 6,191,798 B1 | 2/2001 | Handelman et al. |
| 6,343,905 B1 | 2/2002 | Adams et al. |
| 6,363,369 B1 | 3/2002 | Liaw et al. |
| 6,418,424 B1 | 7/2002 | Hoffberg et al. |
| 6,458,157 B1 | 10/2002 | Suaning |
| 6,509,854 B1 | 1/2003 | Morita et al. |
| 6,532,454 B1 | 3/2003 | Werbos |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,601,049 B1 | 7/2003 | Cooper |
| 6,625,317 B1 | 9/2003 | Gaffin et al. |
| 6,643,627 B2 | 11/2003 | Liaw et al. |
| 6,917,925 B2 | 7/2005 | Berenji et al. |
| 7,395,251 B2 | 7/2008 | Linsker |
| 7,426,501 B2 | 9/2008 | Nugent |
| 7,451,447 B1 | 11/2008 | Deshpande |
| 7,580,907 B1 | 8/2009 | Rhodes |
| 7,653,255 B2 | 1/2010 | Rastogi |
| 7,672,920 B2 | 3/2010 | Ito et al. |
| 7,737,933 B2 | 6/2010 | Yamano et al. |
| 7,752,544 B2 | 7/2010 | Cheng et al. |
| 7,765,029 B2 | 7/2010 | Fleischer et al. |
| 7,849,030 B2 | 12/2010 | Ellingsworth |
| 8,000,967 B2 | 8/2011 | Taleb |
| 8,015,130 B2 | 9/2011 | Matsugu et al. |
| 8,103,602 B2 | 1/2012 | Izhikevich |
| 8,160,354 B2 | 4/2012 | Paquier |
| 8,200,593 B2 | 6/2012 | Guillen et al. |
| 8,311,965 B2 | 11/2012 | Breitwisch et al. |
| 8,315,305 B2 | 11/2012 | Petre et al. |
| 8,390,707 B2 | 3/2013 | Yamashita |
| 8,416,847 B2 | 4/2013 | Roman |
| 8,467,623 B2 | 6/2013 | Izhikevich et al. |
| 8,583,286 B2 | 11/2013 | Fleischer et al. |
| 8,655,815 B2 | 2/2014 | Palmer et al. |
| 8,712,941 B2 | 4/2014 | Izhikevich et al. |
| 8,751,042 B2 | 6/2014 | Lee et al. |
| 9,047,568 B1* | 6/2015 | Fisher ................ G06N 3/049 |
| 9,152,915 B1* | 10/2015 | Gabardos ............ G06N 3/02 |
| 2002/0038294 A1 | 3/2002 | Matsugu |
| 2002/0077726 A1 | 6/2002 | Thorisson |
| 2003/0050903 A1 | 3/2003 | Liaw et al. |
| 2003/0216919 A1 | 11/2003 | Roushar |
| 2003/0218821 A1 | 11/2003 | Sado |
| 2004/0064609 A1 | 4/2004 | Sanma et al. |
| 2004/0136439 A1 | 7/2004 | Dewberry et al. |
| 2004/0170330 A1 | 9/2004 | Fogg et al. |
| 2004/0193670 A1 | 9/2004 | Langan et al. |
| 2005/0015351 A1 | 1/2005 | Nugent |
| 2005/0036649 A1 | 2/2005 | Yokono et al. |
| 2005/0283450 A1 | 12/2005 | Matsugu et al. |
| 2006/0094001 A1 | 5/2006 | Torre et al. |
| 2006/0129506 A1 | 6/2006 | Edelman et al. |
| 2006/0129728 A1 | 6/2006 | Hampel |
| 2006/0161218 A1 | 7/2006 | Danilov |
| 2006/0218555 A1 | 9/2006 | Hayashi |
| 2007/0022068 A1 | 1/2007 | Linsker |
| 2007/0100780 A1 | 5/2007 | Fleischer et al. |
| 2007/0176643 A1 | 8/2007 | Nugent |
| 2007/0193798 A1 | 8/2007 | Allard et al. |
| 2007/0208678 A1 | 9/2007 | Matsugu |
| 2008/0024345 A1 | 1/2008 | Watson |
| 2008/0100482 A1 | 5/2008 | Lazar |
| 2008/0162391 A1 | 7/2008 | Izhikevich |
| 2008/0199072 A1 | 8/2008 | Kondo et al. |
| 2008/0237446 A1 | 10/2008 | Oshikubo et al. |
| 2008/0319933 A1* | 12/2008 | Moussa ................ G06N 3/02 706/31 |
| 2009/0043722 A1 | 2/2009 | Nugent |
| 2009/0287624 A1 | 11/2009 | Rouat et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0169098 A1 | 7/2010 | Patch |
| 2010/0198765 A1 | 8/2010 | Fiorillo |
| 2010/0226824 A1 | 9/2010 | Ophir et al. |
| 2010/0235310 A1 | 9/2010 | Gage et al. |
| 2010/0299296 A1 | 11/2010 | Modha et al. |
| 2011/0016071 A1 | 1/2011 | Guillen et al. |
| 2011/0119214 A1 | 5/2011 | Breitwisch et al. |
| 2011/0119215 A1 | 5/2011 | Elmegreen et al. |
| 2011/0137843 A1 | 6/2011 | Poon et al. |
| 2011/0160741 A1 | 6/2011 | Asano et al. |
| 2011/0191277 A1 | 8/2011 | Agúndez Dominguez et al. |
| 2012/0011090 A1 | 1/2012 | Tang et al. |
| 2012/0011093 A1 | 1/2012 | Aparin et al. |
| 2012/0036099 A1 | 2/2012 | Venkatraman et al. |
| 2012/0041293 A1* | 2/2012 | Levi ................ G06K 9/0051 600/377 |
| 2012/0083982 A1 | 4/2012 | Bonefas et al. |
| 2012/0084240 A1 | 4/2012 | Esser et al. |
| 2012/0109866 A1 | 5/2012 | Modha |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0310871 A1* | 12/2012 | Cruz-Albrecht ....... G06N 3/049 706/33 |
| 2013/0073080 A1 | 3/2013 | Ponulak |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073493 A1 | 3/2013 | Modha |
| 2013/0073495 A1 | 3/2013 | Izhikevich et al. |
| 2013/0073496 A1 | 3/2013 | Szatmary et al. |
| 2013/0073497 A1* | 3/2013 | Akopyan ............ G06N 3/049 706/27 |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204820 A1 | 8/2013 | Hunzinger et al. |
| 2013/0218821 A1 | 8/2013 | Szatmary et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325765 A1 | 12/2013 | Hunzinger |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1* | 3/2014 | Petre ................ G06N 3/049 382/159 |
| 2014/0081895 A1 | 3/2014 | Coenen et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0156574 A1 | 6/2014 | Piekniewski et al. |
| 2014/0156577 A1 | 6/2014 | Eliasmith et al. |

(56) References Cited

U.S. PATENT DOCUMENTS

| | | |
|---|---|---|
| 2014/0193066 A1 | 7/2014 | Richert |
| 2014/0222739 A1 | 8/2014 | Ponulak |
| 2015/0005937 A1* | 1/2015 | Ponulak ............... G06N 3/049 700/253 |

FOREIGN PATENT DOCUMENTS

| | | |
|---|---|---|
| JP | H0487423 A | 3/1992 |
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Shi, R.Z. et al. (2007). "A Neuromorphic VLSI Model of Bat Interaural Level Difference Processing for Azimuthal Echolocation". Circuits and Systems I: Regular Papers, IEEE Transactions on, 54(1), 74-88. DOI:10.1109/TCSI.2006.887981.*

Wang, X. et al. (2008). "A behavior controller based on spiking neural networks for mobile robots". Neurocomputing, 71(4), 655-666. DOI:10.1016/j.neucom.2007.08.025.*

Yamashita, Y. et al. (2008). "Emergence of functional hierarchy in a multiple timescale neural network model: a humanoid robot experiment." PLoS Comput Biol 4.11: e1000220.*

Gurney, K. (1997). "An Introduction to Neural Networks." CRC Press. 126 pages.*

Aleksandrov (1968), Stochastic optimization, Engineering Cybernetics, 5, 11-16.

Alexandros <g class="gr_gr_3 gr-alert gr_spell ContextualSpelling ins-del multiReplace" id="3" data-gr-id="3" >Bouganis</g> and Murray Shanahan, "Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Amari (1998), Why natural gradient?, Acoustics. Speech and Signal Processing, (pp. 1213-1216). Seattle, WA, USA.

Baras, D. et al. "Reinforcement learning, spike-time-dependent plasticity, and the BCM rule." Neural Computation vol. 19 No. 8 (2007): pp. 2245-2279.

Bartlett et al., (2000) "A Biologically Plausible and Locally Optimal Learning Algorithm for Spiking Neurons" Retrieved from http://arp.anu.edu.au/ftp/papers/ jon/brains,pdf.

Baxter et al., (2000), Direct gradient-based reinforcement learning, in Proceedings of the International Symposium on Circuits and Systems, (pp. III-271-274).

Bennett, M.R., (1999), The early history of the synapse: from Plato to Sherrington. Brain Res. Boll., 50(2): 95-118.

Berkes and Wiskott. Slow feature analysis yields a rich repertoire of complex cell properties. Journal of Vision (2005) vol. 5 (6).

Bohte et al., (2000), Spike Prop: backpropagation for networks of spiking neurons, In Proceedings of ESANN'2000, (pp. 419-424).

Bohte et al "A Computational Theory of Spike-Timing Dependent Plasticity: Achieving Robust Neural Responses via Conditional Entropy Minimization" 2004.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs ,cwi ,n11-sbolltedmblicabond)hdthesislxif>.

Booij(2005). A Gradient Descent Rule for Spiking Neurons Emitting Multiple Spikes. Information Processing Letters n. 6. v.95 , 552-558.

Breiman et al., "Random Forests" 33pgs, Jan. 2001.

Brete et al., Brian: a simple and flexible simulator for spiking neural networks, The Neuromorphic Engineer, Jul. 1, 2009, pp. 1-4, doi: 10.2417/1200906.1659.

Capel, "Random Forests and Ferns" LPAC, Jan. 11, 2012, 40 pgs.

Capel, "Random Forests and ferns" LPAC, Jan. 1, 2012, 40 pgs.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

de Queiroz, M. et al. "Reinforcement learning of a simple control task using the spike response model." Neurocomputing vol. 70 No. 1 (2006): pp. 14-20.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

El-Laithy (2011), A reinforcement learning framework for spiking networks with dynamic synapses, Comput Intell Neurosci.

Fidjeland, et al., "Accelerated Simulation of Spiking Neural Networks Using GPUs," WCCI 2010 IEEE World Congress on Computational Intelligence, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity, Neuron 65, Feb. 25, 2010, pp. 563-576.

Fletcher (1987), Practical methods of optimization, New York, NY: Wiley-Interscience.

Floreano et al., 'Neuroevolution: from architectures to learning' Evol. Intel. Jan. 2008 1:47-62, [retrieved Dec. 30, 2013] [retrieved online from URL:<http:></http:>.

Florian (2005), A reinforcement learning algorithm for spiking neural networks SYNASC '05 Proceedings of the Seventh International Symposium on Symbolic and Numeric Algorithms for Scientific Computing.

Foldiak, P. Learning invariance from transformation sequences. Neural Computation, 1991, 3(2), 194-200.

Froemke et al., Temporal modulation of spike-timing-dependent plasticity, Frontiers in Synaptic Neuroscience, vol. 2, Artic[e 19, pp. 1-16 [online] Jun. 2010 [retrieved on Dec. 16, 2013]. Retrieved from the internet:<frontiersin.org>.

Fu (2005) Stochastic Gradient Estimation, Technical Research Report.

Fyfe et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. 1-16. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.coinlurl ?sa—t&rct—j&q—Giuck+4)/022STIMULUS+GENERALIZATION+AND+REPRESENTATION+1N +ADAPTIVE+NETWORK+MODELS±0F+CATEGORY+LEARN I NG%22+1991.

(56) References Cited

OTHER PUBLICATIONS

Glynn (1995), Likelihood ratio gradient estimation for regenerative stochastic recursion Advances in Applied Probability 27.4. 1019-1053.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Govindhasamy, James J., Sean F. McLoone, and George W. Irwin. "Sequential learning for adaptive critic design: An industrial control application." Machine Learning for Signal Processing, 2005 IEEE Workshop on. IEEE, 2005.
Graham, Lyle J., The Surf-Hippo Reference Manual, http:ifwww.neurophys.biomedicaleamivparis5. frigraham/ surf-hippo-files/ Surf-Hippo%20Reference/020Manual.pdf, Mar. 2002. pp. 1-128.
Hani H., et al., "Evolving Spiking Neural Network Controllers for Autonomous Robots", IEEE 2004.
Hanselmann T., et al., "Continuous-time Adaptive Critics," IEEE Transactions on Neural Networks, 2007, vol. 18 (3), pp. 631-647.
Ho, "Random Decision Forests" Int'l Conf. Document Analysis and Recognition, 1995, 5 pgs.
Hopfield JJ (1995) Pattern recognition computation using action potential timing for stimulus representation.Nature 376: 33-36.
In search of the artificial retina [online]. Vision Systems Design. Apr. 1, 2007.
International Search Report and Written Opinion for Application No. PCT/US2013/044124, mailed on 12 &Itg class="gr_gr_4 gr-alert gr_spell ContextualSpelling ins-del multiReplace" id="4" data-gr-id="4">Septermber&It;/g> 2013, 6 Pages.
International Search Report for Application No. PCT/US2013/026738, mailed on Jul. 21, 2014,4 pages.
International Search Report for International Application PCT/US2013/060352 dated Jan. 16, 2014.
International Search Report for PCT/US2013/052136 dated Nov. 21, 2013.
International Search Report and Written Opinion for Application No. PCT/US2013/052136, mailed on Nov. 21, 2013, 5 Pages.
International Search Report and Written Opinion for Application No. PCT/US2013/060352, mailed on Jan. 16, 2014, 18 Pages.
Izhikevich E. M, and Hoppensteadt F.C. (2009) Polychronous Wavefront Computations. International Journal of Bifurcation and Chaos, 19:1733-1739.
Izhikevich E.M. (2004) Which Model to Use for Cortical Spiking Neurons? IEEE Transactions on Neural Networks, 15:1063-1070.
Izhikevich E.M. (2006) Polychronization: Computation With Spikes. Neural Computation, 18:245-282.
Izhikevich, E,M. (2007) Dynamical Systems in Neuroscience: The Geometry of Excitability and Bursting, The MIT Press, 2007.
Izhikevich et al., 'Relating STDP to BCM', Neural Computation (2003) 15, 1511-1523.
Janowitz, M.K.; Van Rossum, M.C.W. Excitability changes that complement Hebbian learning. Network, Computation in Neural Systems, 2006, 17 (1), 31-41.
Kaelbling, Leslie Pack, Michael L. Littman, and Andrew W. Moore. "Reinforcement learning: A survey." arXiv preprint cs/9605103 (1996).
Kalal et al. Online learning of robust object detectors during unstable tracking published on 3rd On-line Learning for Computer Vision Workshop 2009, Kyoto, Japan, IEEE CS.
Karbowski et al., 'Multispikes and Synchronization in a Large Neura[ Network with Temporal Delays', Neural Computation 12. 1573-1606 (2000).
Kenji Doya (2000), Reinforcement Learning in Continuous Time and Space, Neural Computation, 12:1. 219-245.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet &It;URL: http://www-ee.uta.edu/eeweb/IP/Courses/SPR/Reference/ Khotanzad.pdf.
Kiefer (1952), Stochastic Estimation of the Maximum of a Regression Function, Annals of Mathematica[ Statistics 23, #3, 462-466.
Klampfl (2009), Spiking neurons can learn to solve information bottleneck problems and extract independent components, Neural Computation, 21(4), pp. 911-959.
Kleunen et al., Optimization and sensitivity analysis of computer simulation models by the score function method Invited Review European Journal of Operational Research, Mar. 1995.
Klute et al., "Artificial Muscles: Actuators for Biorobotic Systems," The International Journal Robotics Research, 2002, vol. 21, pp. 295-309.
Knoblauch, et at Memory Capacities for Synaptic and Structural Plasticity, Neural Computation 2009, pp. 1-45.
Larochelle et al., (2009), Exploring Strategies for Training Deep Neural Networks, J. of Machine Learning Research, v. 10, pp. 1-40.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: &It;URL'https://code.google.com/p/ nnql/issues/detail?id=1>.
Lazar et a]. 'Multichannel time encoding with integrate-and-fire neurons.' Neurocomputing 65 (2005): 401-407.
Lazar et al. 'A video time encoding machine', in Proceedings of the 15th IEEE International Conference on Image Processing (ICIP '08 2008, pp. 717-720.
Lazar et al. 'Consistent recovery of sensory stimuli encoded with Mimo neural circuits.' Computational intelligence and neuroscience (2010): 2.
Legenstein, R., et al. (2008), .A learning theory for reward-modulated spike timingsdependent plasticity with application to biofeedback. PLoS Computational Biology. 4(10): 1 -27.
Lendek Babushka Z.S., and De Schutter B. (2006) State Estimation under Uncertainty- . A Survey: 'Technical report 06-004 Deth Center for systems and Control Delft University of Technology.
Lin, Long-Ji. "Self-improving reactive agents based on reinforcement learning, planning and teaching." Machine learning 8.3-4 (1992): 293-321.
Masquelier and Thorpe, Learning to recognize objects using waves of spikes and Spike Timing-Dependent Plasticity. Neural Networks (IJCNN), The 2010 International Joint Conference on DOI—10.1109/1JCNN.2010.5596934 (2010) pp. 1-8.
Masquelier et al., "Unsupervised Learning of Visual Features through Spike Timing Dependent Plasticity", PLoS Computational Biology, 2007,vol. e31, pp. 0247-0257.
Masquelier, Timothee, 'Relative spike time coding and STOP-based orientation selectivity in the early visual system in natural continuous and saccadic vision; a computational model.' Journal of computational neuroscience 32.3 (2012): 425-441.
Meister, M.; Berry, M.J. The neural code of the retina, Neuron, 1999, 22, 435-450.
Meister, M, Multineuronal codes in retinal signaling. Proceedings of the National Academy of sciences. 1996, 93, 609-614.
Nichols, A Re configurable Computing Architecture for Implementing Artificial Neural Networks on FPGA, Master's Thesis, The University of Guelph, 2003, pp. 1-235.
Nikolic, K., San Segundo Bello D.. Delbruck T, Liu, S.. and Roska, B. High-sensitivity silicon retina for robotics and prosthetics 2011.
Niv, et al., Evolution of Reinforcement Learning in Uncertain Environments: A Simple Explanation for Complex Foraging Behaviors, International Society for Adaptive Behavior, 2002, vol. 10(1), pp. 5-24.
Ojala et al., "Performance Evaluation of Texture Measures with Classification Based on Kullback Discrimination of Distributions" 1994 IEEE, pp. 582-585.
Oster M., Lichtsteiner P Delbruck T, Liu S, A Spike-Based Saccadic Recognition System, ISCAS 2007. IEEE International Symposium on Circuits and Systems, 2009, pp. 3083-3086.

(56) References Cited

OTHER PUBLICATIONS

Ozuysal et al., "Fast Keypoint Recognition Using Random Ferns" IEEE Iransactions on Pattern Analysis and Machine Intelligence, Vo[. 32, No. 3. Mar. 2010. pp. 448-461.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].
Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online][Retrieved on Dec. 10, 2013] Retrieved from the Internet &It;URL: http://citeseerx.ist.psu.edu! viewdoc/download?doi= 0.1.1.5.4346&rep—repl&type-pdf.
Pfister (2003), Optimal Hebbian LearningL: A Probabilistic Point of View. In ICANN Proceedings. Springer, pp. 92-98.
Pfister (2006), Optimal Spike-Timer Dependent Plasticity for Precise Action Potential Firing in Supervised Learning, Neural computation ISSN 0899-7667, 18 (6).
Phenomenological models of synaptic plasticity based on spike timing Abigail Morrison Markus Diesmann Wulfram Gerstner Received: Jan. 16, 2008 / Accepted: Apr. 9, 2008 © The Author(s) 2008.
Ponulak, "Analysis of the Resume learning Process for Spiking Neural Networks," International Journal of Applied Mathematics & Computer Science, 2008, vol. 18 (2), pp. 117-127.
Ponulak, F., (2005), ReSuMe—New supervised learning method for Spiking Neural Networks Technical Report, Institue of Control and Information Engineering, Poznan University of Technology.
Prokhorov, Danil V., and Lee A. Feldkamp. "Primitive adaptive critics." Neural Networks, 1997., International Conference on. vol. 4. IEEE, 1997.
Reiman et al. (1989). Sensitivity analysis for simulations via likelihood ratios. Oper Res 37, 830-844.
Reinforcement Learning in Intelligent Control: A Biologically-Inspired Approach to the Relearning Problem. Brendan D'Cruz May 1998.
Rekeczky, et al., "Cellular Multiadaptive Analogic Architecture: A Computational Framework for UAV Applications." May 2004.
Revow M., Williams C., and Hinton, G.E., 1996. Using Generative Models for Handwritten Digit Recognition, IEEE Trans. on Pattern Analysis and Machine Intelligence, 18, No. 6, Jun. 1996.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Rumelhart (1986), Learning internal representations by error propagation, Paralle[ distributed processing, Vo[. 1 (pp. 318-362), Cambridge, MA: MIT Press.
Rumelhart et a[., (1986), Learning representations by back-propagating errors, Nature 323 (6088) , pp. 533-536.
Sanchez, Efficient Simulation Scheme for Spiking Neural Networks. Doctoral Thesis. (Juiversita di Granada Mar. 28, 2008, pp. 1-104.
Sato et al., 'Pulse interval and width modulation for video transmission.' Cable Television, IEEE Transactions on 4 (1978): 165-173.
Schemmel, J., Grub!, A., Meier, K., Mueller, E.: Implementing synaptic plasticity in a VLSI spiking neural network model. In: Proceedings of the 2006lntemational Joint Conference on Neural Networks (IJCNN'06), IEEE Press (2006) Jul. 16-21, 2006, pp. 1-6 [online], [retrieved on Aug. 24, 2012]. Retrieved from the Internet &It;URL: http://www.kip.uniheidelberg.deNeroeffentlichungen/ download.cgi/4620/ps/1774.pdf> Introduction.
Schnitzer, M.J.; Meister, M.; Multineuronal Firing Patterns in the Signal from Eye to Brain. Neuron, 2003, 37, 499-511.
Schreiber S., et al., "A New Correlation-based Measure of Spike Timing Reliability," Neurocomputing, 2003, vol. 52-54, pp. 925-931.
Serrano-Gotarredona, et al, "On Real-Time: AER 2-D Convolutions Hardware for Neuromorphic Spike-based Cortical Processing", Jul. 2008.
Seung. H. "Learning in spiking neural networks by reinforcement of stochastic synaptic transmission." Neuron vol. 40 No. 6 (2003): pp. 1063-1073.
Simulink.RTM. model [online], [Retrieved on Dec. 10, 2013] Retrieved from &It;URL: http://www.mathworks.com/ products/ simulink/index.html>.
Sinyavskiy, et al. (2010), Generalized Stochastic Spiking Neuron Model and Extended Spike Response Model in Spatial-Temporal Impulse Pattern Detection Task Optical Memory and Neural Networks (Information Optics) 2010 vol. 19 No. 4 pp. 300-309.
Sinyavskiy O. Yu., "Obuchenics podkrepleniem spaikovoy neiroiniy seti v zadache upravleniya agentom v diskretnoy virtualnoy srede," Nelineinaya Dinamika, 2011, vol. T. 7 (24), pp. 859-875, Non-English; considered based on English abstract.
Sjostrom et al., 'Spike-Timing Dependent Plasticity' Scholarpedia, 5(2):1362 (2010), pp. 1-18.
Sjostrom, Jesper et al., 'Spike-Timing Dependent Plasticity,' Scholarpedia, 5 (2):1362 (2010), pp. 1-12.
Stein. R.B..(1967).Some models of neural variability. Biophys. J.. 7:.37-68.
Supervised learning in Spiking Neural .Networks with ReSuMe Method. Filip Ponulak, Doctoral Dissertation Poznan, Poland 2006.
Sutton R.S. (1988). Learning to predict by the methods of temporal differences. Machine Learning 3(1), 9-44.
Swinehart C.D., et al., "Dimensional Reduction for Reward-based Learning.," Network: Computation in Neural Systems, 2006, vol. 17 (3), pp. 235-252.
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371%2Fjournal,pcbi.10008798&It;url:>&It;/url:>.
Thomas S. and Riesenhuber, M, 2004, Realistic Modeling of Simple and Complex Cell Tuning in the HMAX Model, and Implications for Invariant Object Recognition in Cortex, Al Memo 2004-017 Jul. 2004.
Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.
Thorpe. S.J., Delorme, A. & VanRullen, R, (2001). Spike-based strategies for rapid processing. Neural Networks 14, pp. 715-725.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weigbt Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Van Rullen R,; Thorpe, S, Rate Coding versus temporal order coding: What the Retinal ganglion cells tell the visual cortex. Neural computation, 2001, 13, 1255-1283.
VanRullen, R, & Koch, C. (2003), Is perception discrete or continuous? Trends in Cognitive Sciences 7(5), pp. 207-213.
VanRullen, R., Guyonneau, R. & Thorpe, S.J. (2005). Spike times make sense, Trends in Neurosciences 28(1).
Vasilaki, et al., "Learning flexible sensori-motor mappings in a complex network" Biol Cybern (2009) 100:147-158.
Vasilaki et al,, "Spike-Based Reinforcement Learning in Continuous State and Action Space: When Policy Gradient Methods Fail" PLoS, vol. 5, Issue 12, Dec. 2009.
Wallis, G.; Rolls, E. T. A model of invariant object recognition in the visual system, Progress in Neurobiology. 1997, 51, 167-194.
Wang 'The time dimension for scene analysis.' Neural Networks, IEEE Transactions on 16.6 (2005): 1401-1426.

(56) References Cited

OTHER PUBLICATIONS

Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Weber, C. et al. 'Robot docking with neural vision and reinforcement.' Knowledge-Based Systems vol. 17 No. 2 (2004): pp. 165-172.
Weber et al., (2009), Goal-Directed Feature Learning, In: Proc, International Joint Conference on Neural Networks, 3319 3326.
Werbos P.J. (1992), or Prokhorov D.V and Wunsch D.C. (1997) Adaptive Critic Designs, IEEE Trans Neural Networks, vol. 8. No. 5, pp. 997-1007.
White, D. A., & Sofge, D. A. (Eds.). (1992): Handbook of intelligent control. Neural, fuzzy, and adaptive approaches. Van Nostrand Reinhold-New York.
Widrow B. Hoff. M.E. (1960) Adaptive Switching Circuits, IRE WESCON Convention Record 4: 96-104.
Widrow, Bernard, Narendra K. Gupta, and Sidhartha Maitre. "Punish/reward: Learning with a critic in adaptive threshold systems." Systems, Man and Cybernetics, IEEE Transactions on 5 (1973): 455-465.
Williams (1992), Simple Statistical Gradient-Following Algorithms for Connectionist Reinforcement Learning, Machine Learning 8, 229-256.
Wiskott, L.; Sejnowski, T.J. Slow feature analysis: Unsupervised learning of invariances, Neural Computation, 2002, 14, (4), 715-770.
Xiaohui Xie and H. Sebastian Seung, "Learning in neural networks by reinforcement of irregular spiking", Physical Review E. volume 69, letter 041909, 2004, pp. 1-10.
Yi (2009), Stochastic search using the natural gradient, ICML '09 Proceedings of the 26th Annual International Conference on Machine Learning. New York, NY, USA.
Zarandy, et al., "Bi-l: A Standalone Ultra High Speed Cellular Vision System", Jun. 2005, Abstract only.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Florian, Razvan V., Reinforcement Learning Through Modulation of Spike-Timing-Dependent Synaptic Plasticity, Neural Computation 19, 1468-1502 (2007) Massachusetts Institute of Technology.
Fremaux. N et al., "Functional Requirements for Reward-Modulated Spike-Timing-Dependent Plasticity", The Journal of Neuroscience, Oct. 6, 2010, 30 (40)1 3326-13337.
Fu (2008), What You Should Know About Simulation and Derivatives Naval Research Logistics, vol. 55, No. 8, 723-736.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098, Printed on Aug. 27, 2012.
Hagras, Hani, et al., "Evolving Spiking Neural Network Controllers for Autonomous Robots", IEEE 2004.
Izhikevic, F. (2007), Solving the Distal Reward Problem through Linkage of ST DP and Dopamine Signaling, Cerebral Cortex, vol. 17, 2443-2452.
Izhikevich, 'Simple Model of Spiking Neurons', IEEE Transactions on Neural Networks, vol. 14, No. 6, Nov. 2003, pp. 1569-1572.
Pearson, J.C. et al., "Applications of Neural Networks in Video Signal Processing," Part of Advances in Neural Information Processing Systems 3, 1990, pp. 289-295.
Matsugu, et al., "Convolutional Spiking Neural Network Model for Robust Face Detection", Proceedings of the 9th International Conference on Neural Information Processing (ICONIP'02), vol. 2, 2002, pp. 660-664.
Ozuysal et al., "Fast Keypoint Recognition in len Lines of Code" CVPR 2007.
Ponulak, F., et al., Supervised learning in spiking neural networks with ReSuMe: sequence learning, classification, and spike shifting. Neural Comp.22(2): 467-510..2009.
Richter, Mathis, "A robotic architecture for action selection and behavioral organization inspired by human cognition",Oct. 2012, IEEE/RSJ International Conference on Intelligent Robots and Systems, 2457-2464.
Schrauwen et al., "Improving SpikeProp: Enhancements to an Error-Backpropagation Rule for Spiking Neural Networks", ProsRISC Workshop, 2004, pp. 301-305.
Tegner J., et al., "An Adaptive Spike-timing-dependent Plasticity Rule" Elsevier Science B.V., 2002.
Thorpe, S.J., et al. (2004), SpikeNet: real-time visual processing with one spike per neuron, Neurocomputing, 58-60, pp. 857-864.
Wang, R. et al., A programmable axonal propagation delay circuit for time-delay spiking neural networks. Circuits and System (ISCAS), 2011 IEEE International Symposium on. May 15-18, 2011, pp. 869-872 [retrieved on Nov. 13, 2013]. [retrieved from ieeexplore.ieee.org].

\* cited by examiner

APPARATUS AND METHODS FOR BACKWARD PROPAGATION OF ERRORS IN A SPIKING NEURON NETWORK

RELATED APPLICATIONS

This application is related to co-owned, U.S. patent application Ser. No. 13/774,934, entitled "APPARATUS AND METHODS FOR RATE-MODULATED PLASTICITY IN A SPIKING NEURON NETWORK" filed Feb. 22, 2013, Ser. No. 13/763,005, entitled "SPIKING NETWORK APPARATUS AND METHOD WITH BIMODAL SPIKE-TIMING DEPENDENT PLASTICITY" filed Feb. 8, 2013, Ser. No. 13/152,105, filed Jun. 2, 2011 and entitled "APPARATUS AND METHODS FOR TEMPORALLY PROXIMATE OBJECT RECOGNITION", Ser. No. 13/487,533, filed Jun. 4, 2012 and entitled "SYSTEMS AND APPARATUS FOR IMPLEMENTING TASK-SPECIFIC LEARNING USING SPIKING NEURONS", Ser. No. 14/020,376, filed Sep. 6, 2013 and entitled "APPARATUS AND METHODS FOR EVENT-BASED PLASTICITY IN SPIKING NEURON NETWORKS", Ser. No. 13/548,071, filed Jul. 12, 2012 and entitled "SPIKING NEURON NETWORK SENSORY PROCESSING APPARATUS AND METHODS", Ser. No. 13/560,891, filed Jul. 27, 2012, and entitled "APPARATUS AND METHODS FOR EFFICIENT UPDATES IN SPIKING NEURON NETWORK", Ser. No. 13/239,259, filed Sep. 21, 2011 and entitled "APPARATUS AND METHOD FOR PARTIAL EVALUATION OF SYNAPTIC UPDATES BASED ON SYSTEM EVENTS", Ser. No. 13/540,429, filed Jul. 2, 2012 and entitled "SENSORY PROCESSING APPARATUS AND METHODS", Ser. No. 13/623,820, filed Sep. 20, 2012 and entitled "APPARATUS AND METHODS FOR ENCODING OF SENSORY DATA USING ARTIFICIAL SPIKING NEURONS", Ser. No. 13/623,838, filed Sep. 20, 2012 and entitled "SPIKING NEURON NETWORK APPARATUS AND METHODS FOR ENCODING OF SENSORY DATA", Ser. No. 13/868,944, filed Apr. 23, 2013 and entitled "EVENT-BASED COMMUNICATION IN SPIKING NEURON NETWORKS COMMUNICATING A NEURAL ACTIVITY PAYLOAD WITH AN EFFICACY UPDATE", Ser. No. 13/689,717, entitled "APPARATUS AND METHODS FOR OBJECT DETECTION VIA OPTICAL FLOW CANCELLATION", filed Nov. 29, 2012, Ser. No. 12/869,573, filed Aug. 26, 2010 and entitled "SYSTEMS AND METHODS FOR INVARIANT PULSE LATENCY CODING", Ser. No. 12/869,583, filed Aug. 26, 2010, entitled "INVARIANT PULSE LATENCY CODING SYSTEMS AND METHODS", Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", Ser. No. 13/152,084, filed Jun. 2, 2011, entitled "APPARATUS AND METHODS FOR PULSE-CODE INVARIANT OBJECT RECOGNITION", Ser. No. 13/239,255 filed Sep. 21, 2011, entitled "APPARATUS AND METHODS FOR SYNAPTIC UPDATE IN A PULSE-CODED NETWORK", Ser. No. 13/487,576 entitled "DYNAMICALLY RECONFIGURABLE STOCHASTIC LEARNING APPARATUS AND METHODS", filed Jun. 4, 2012, and U.S. Pat. No. 8,315,305, entitled "SYSTEMS AND METHODS FOR INVARIANT PULSE LATENCY CODING" issued Nov. 20, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to, inter alia, machine learning and training of artificial neural networks.

Background

Spiking neural networks may be utilized in a variety of applications such as, for example, image processing, object recognition, classification, robotics, and/or other. Such networks may comprise multiple nodes (e.g., units, neurons) interconnected with one another via, e.g., synapses (doublets, connections).

As used herein "back propagation" is used without limitation as an abbreviation for "backward propagation of errors" which is a method commonly used for training artificial neural networks. As a brief aside, back propagation is characterized as a supervised learning method, and is a generalization of the so-called "delta rule" which is a form of gradient descent learning characterized by manipulation of weights within an array (or "network layer") consisting of a single perceptron layer. The classical perceptron generates a binary output one (1) when an input value scaled by a weight (w) and a bias (b) exceed 0; otherwise the perceptron generates a binary output zero (0).

Using a target (desired) output and sensory input, an artificial neural network composed of multiple network layers that are sequentially coupled may be configured to, e.g., identify an object (e.g., a specific dog) from a series of images (e.g., pictures of many different dogs). Back propagation algorithms communicate real valued error values from one layer of the network to a prior network layer. It may be of benefit to train spiking neural networks using back propagation methodologies.

SUMMARY

In one aspect, a method of communicating feedback from one layer to another layer of a multilayer spiking neuron network is disclosed. In one implementation, the method includes: determining the feedback based at least on an output from the one layer and a teaching input into the one layer; encoding the feedback into a property of at least one spike; communicating the at least one spike to the another layer; based on the at least one spike, determining an error associated with an output of the another layer; and adjusting an efficacy of an input connection into the another layer based on an input to the another layer and the error.

In one variant, the output of the one layer is configured based on the output of the another layer and efficacy of at least one connection between the one and another layers; and the output of the another layer is determined based at least on the input to the another layer and the efficacy.

In a further variant, the input to the another layer is configured to communicate information related to one or more objects; the teaching input is configured to indicate a target object; and the output of the one layer is indicative of an occurrence of the target object within the one or more objects.

In yet another variant, the method further includes: adjusting the efficacy of the at least one connection between the one and another layers based on the output of the another layer and the feedback. The one or more spikes may be communicated from the one layer to the another layer via a feedback connection; and the efficacy of the feedback connection is configured to be adjusted based on the output of the another layer and the feedback.

In another variant, the another layer comprises a first spiking neuron; the one layer comprises a second spiking neuron; adjusting the efficacy of the at least one connection between the one a d the another layers is based on an event associated with the second neuron; and adjusting efficacy of the feedback connection is configured based on an event associated with the first neuron.

In yet another variant, the property comprises spike latency; and the encoding is selected from the group consisting of linear encoding and logarithmic encoding.

In a further variant, the at least one spike comprises a first and a second spike;

the property comprises spike latency; and the encoding comprises binary encoding configured to determine a latency of the first spike based at least on a first bit value associated with the feedback, and a latency of the second spike based at least on a second bit value associated with the feedback.

In yet another variant, the at least one spike is configured to communicate payload information comprising a plurality of bits; and the feedback is encoded into the plurality of bits.

A controller apparatus useful for controlling, inter alia, a robot, is also disclosed. In one embodiment, the apparatus includes: a first plurality of spiking neurons configured to receive, via a plurality of input connections, a sensory input associated with an environment of the robot, and to provide a signal conveying information about an object within the environment; a second plurality of spiking neurons configured to determine a control output based at least on the signal; and one or more output connections configured to provide the control output for the robot.

In one variant, the second plurality of neurons is configured to: determine an error measure based at least on the control output and the teaching input; and communicate the error measure to the first plurality of neurons via a feedback interface, the interface sharing access to the neuron with the one or more output connections.

In another variant, the second plurality of neurons is configured to be updated at a plurality of iterations; and the control output and communication of the error measure by the second plurality of neurons is configured as a time multiplex. The multiplex is in one implementation characterized by at least: a first portion of the plurality of iterations being configured to provide the control output to the robot; and a second portion of the plurality of iterations being configured to communicate the feedback to the first plurality of neurons.

In another variant, individual iterations within the first portion and the second portion of the plurality of iterations are arranged in an alternating order; e.g., individual iterations within one of the first portion or the second portion of the plurality of iterations comprise even iterations; and individual iterations within the other one of the first portion or the second portion of the plurality of iterations comprise odd iterations.

In a further variant, individual neurons of the first plurality of spiking neurons are operably coupled to one or more individual neurons of the second plurality of spiking neurons via a plurality of feed forward and a plurality of feedback connections; individual ones of the plurality of feed forward connections are configured to communicate the signal from the first plurality of spiking neurons to the second plurality of spiking neurons; individual ones of the plurality of feedback connections are configured to communicate the error from the second plurality of spiking neurons to the first plurality of spiking neurons; individual ones of the plurality of feed forward connections are characterized by a feedforward efficacy, the feed forward efficacy of a given feed forward connection configured to be adjusted based at least on the error measure and a portion of the signal communicated via the given feed forward connection; and individual ones of the plurality of feedback connections are characterized by feedback efficacy, the feedback efficacy of a given feedback connection is configured to be adjusted based at least on the error measure and a portion of the signal communicated via the given feed-forward connection to a given neuron of the second plurality of neurons.

A method for operating a multilayer spiking neuron network is also disclosed. In one implementation, the method includes: configuring one or more efficacies corresponding to one or more connections providing input to at least one first spiking neuron of the multilayer spiking neuron network; determining an error signal at one or more neurons which are subsequently connected to the at least one first spiking neuron; encoding the error signal into a property of at least one spike; communicating the at least one spike from at least one of the one or more neurons to the at least one first neuron; and adjusting the one or more efficacies based at least on the communicated at least one spike.

An apparatus is also disclosed. In one embodiment, the apparatus includes a non-transitory computer-readable storage medium having a plurality of instructions configured to, when executed by a processor, cause the apparatus to: determine a feedback based at least on an output from one layer and a teaching input into the one layer; encode the feedback into a property of at least one spike; communicate the at least one spike to an other layer; based on the at least one spike, determine an error associated with an output of the other layer; and adjust an efficacy of an input connection into the other layer based on an input to the other layer and the error; wherein: the at least one spike is configured to communicate payload information comprising a plurality of bits; and the feedback is encoded into the plurality of bits.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
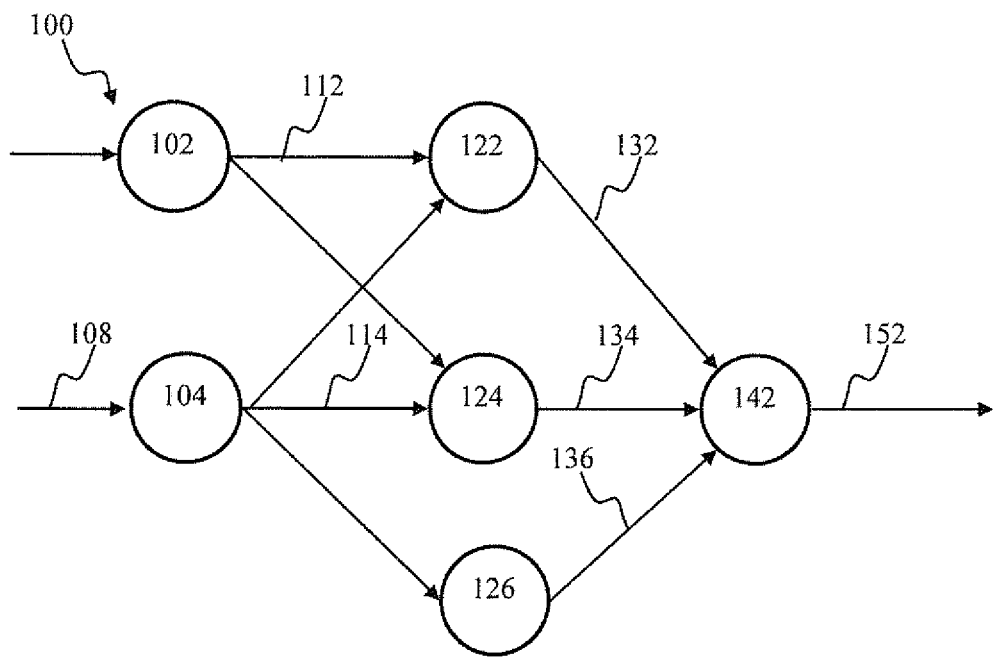
FIG. 1 is a graphical illustration depicting a multilayer artificial neuron network, configured for object recognition, in accordance with one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that are used to access the synaptic and neuron memory. The "bus" may be electrical, optical, wireless, infrared, and/or any type of communication medium. The exact topology of the bus could be, for example: a standard "bus", a hierarchical bus, a network-on-chip, an address-event-representation (AER) connection, and/or any other type of communication topology configured to access e.g., different memories in a pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication, and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB®, PASCAL, Python®, assembly language, markup languages (e.g., HTML, SGML, XML, VoXML), object-oriented environments (e.g., Common Object Request Broker Architecture (CORBA)), Java® (e.g., J2ME®, Java Beans), Binary Runtime Environment (e.g., BREW), and/or other programming languages and/or environments.

As used herein, the terms "link", "transmission channel", "delay line", "wired", and/or "wireless" may include a connection between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2

SDRAM, EDO/FPMS, RLDRAM, SRAM, "flash" memory (e.g., NAND/NOR), memristor memory, PSRAM, and/or other types of memory.

As used herein, the terms "integrated circuit (IC)", and "chip" are meant to refer without limitation to an electronic circuit manufactured by the patterned diffusion of elements in or on to the surface of a thin substrate. By way of non-limiting example, integrated circuits may include field programmable gate arrays (e.g., FPGAs), programmable logic devices (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of Fire Wire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 30, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" are meant generally to denote a full (or partial) set of dynamic variables used to describe node state.

As used herein, the terms "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), NEC or RFID systems (e.g., ISO 14443 compliant), and/or other wireless interfaces.

DETAILED DESCRIPTION OF EXEMPLARY IMPLEMENTATIONS

Apparatus and methods for developing robotic controllers comprising parallel networks are disclosed. In some implementations, a parallel network may comprise at least a first and second neuron layers. The second layer may be configured to determine a measure of discrepancy (error) between a target network output and actual network output. The network output may comprise a control signal configured to cause a task execution by a robot, robotic mechanism, etc. The error may be communicated back to the first neuron layer in order to adjust the efficacy of input connections into the first layer. The error may be encoded as a spike latency using linear or nonlinear encoding. Error communication and control signal provisioning may be time multiplexed so as to enable target action execution. The efficacy associated with forward and backward/reverse connections may be stored in individual arrays. In one such exemplary embodiment, synchronization mechanisms may be employed to match forward/reverse efficacy in order to implement plasticity using hardware compliant high level neuromorphic language description (HC-HLND) methodologies.

FIG. 1 illustrates an exemplary implementation of a multilayer artificial spiking neuron network, configured for object recognition. A multilayer network may comprise two or more layers of spiking neurons e.g., the network 100 of FIG. 1 comprising three layers. As shown, the first layer includes neurons 102, 104; the second layer includes neurons 122, 124, 126; and the third layer includes neuron 142. The first layer neurons 102, 104 may receive sensory input 108 and communicate their output to the second layer neurons 122, 124, 126 via one or more connections (112, 114). The second layer neurons 122, 124, 126 may communicate output generated based on one or more inputs 112, 114 to neuron 142 via one or more connections (132, 134, 136). While the foregoing network 100 of FIG. 1 is provided for illustrative purposes, those of ordinary skill in the related arts will readily appreciate that connectivity can be implemented according to a variety of topologies e.g., one-to-one, one-to-all, all-to-one, some to some, etc.

Referring back to FIG. 1, the neurons (also referred to as units) of the exemplary network 100 may communicate with one another by means of "spikes" or electrical pulses. Additionally, as used herein, the terms "pre-synaptic" and "post-synaptic" are used to describe a neuron's relation to a connection. For example, with respect to the connection 112, the units 102 and 122 are referred to as the pre-synaptic and the post-synaptic unit, respectively. It is noteworthy, that the same unit is referred to differently with respect to different connections. For instance, unit 122 is referred to as the pre-synaptic unit with respect to the connection 132, and the post-synaptic unit with respect to the connection 112.

Individual connections (e.g., 132) are characterized by a connection efficacy. Connection efficacy, in general, refers to a magnitude of weight and/or probability of input spike influence on the neuronal response (e.g., output spike generation or firing). The efficacy may comprise, for example, a parameter—synaptic weight—by which one or more state variables of the post synaptic unit may be changed). During operation of a pulse-code network (e.g., the network 100), synaptic weights can be dynamically adjusted according to spike-timing dependent plasticity (STDP), in order to implement, among other things, network learning. In one or more implementations, the STDP mechanism may comprise a rate-modulated plasticity mechanism such as for example those described in commonly owned U.S. patent application Ser. No. 13/774,934, entitled "APPARATUS AND METHODS FOR RATE-MODULATED PLASTICITY IN A NEURON NETWORK" filed Feb. 22, 2013, and/or a bi-modal plasticity mechanism, for example, such as described in commonly owned U.S. patent application Ser. No. 13/763,005, entitled "SPIKING NETWORK APPARATUS AND METHOD WITH BIMODAL SPIKE-TIMING DEPENDENT PLASTICITY" filed Feb. 8, 2013, each of the foregoing being incorporated herein by reference in its entirety.

Individual units may be allocated unit memory configured to store, inter alia, state data of the respective unit. Exemplary schemes are described in e.g., commonly owned U.S. patent application Ser. No. 13/152,105, filed Jun. 2, 2011 and entitled "APPARATUS AND METHODS FOR TEMPORALLY PROXIMATE OBJECT RECOGNITION" and/or U.S. patent application Ser. No. 13/487,533, filed Jun. 4, 2012 and entitled "SYSTEMS AND APPARATUS FOR IMPLEMENTING TASK-SPECIFIC LEARNING USING SPIKING NEURONS", each of the foregoing being incorporated herein by reference in its entirety. As described therein, each unit's state parameter may comprise unit excitability, firing threshold, stochasticity parameter, etc.

The units may be operated in accordance with one or more unit update rules. Unit update rules may be configured to access (read/write) memory of the respective unit. The unit update rule may be configured to be executed periodically, e.g., based on local or global timer. At appropriate intervals, a unit may generate an electrical pulse or event (also called a "spike"). The units may configure a payload associated with the spike. The payload may be stored in the unit's memory (e.g., as described in commonly owned U.S. patent application Ser. No. 14/020,376, filed Sep. 6, 2013 and entitled "APPARATUS AND METHODS FOR EVENT-BASED PLASTICITY IN SPIKING NEURON NETWORKS", the foregoing being incorporated herein by reference in its entirety).

A unit event may trigger spike delivery for outgoing synapses and/or execution of one or more plasticity rules associated with incoming synapses. For example, for the unit 102 may trigger a spike delivery via the synapse 112. Similarly, unit 142 may execute plasticity rules based on incoming synapses via 132, 134, and/or 136. In some implementations, spike delivery may be implemented by the synapses.

Individual synapses may be operated in accordance with one or more synapse-rules. The synapse rule may be configured to: access (read/write) memory of the connection; access memory of the post-synaptic unit; and access memory of the pre-synaptic unit.

In one or more implementations, the synapse rules may comprise an update rule and/or plasticity rule. The update rule may be executed periodically (e.g., at 1 ms to 100 ms intervals based on a timer). The update rule may be configured to adjust (e.g., increase or decrease) connection efficacy in accordance with a connection dynamic process. In some implementations, the connection dynamic process may comprise an exponential decay of connection weight e.g. as described in commonly owned U.S. patent application Ser. No. 13/548,071, filed Jul. 12, 2012 and entitled "SPIKING NEURON NETWORK SENSORY PROCESSING APPARATUS AND METHODS", and U.S. patent application Ser. No. 13/560,891, filed Jul. 27, 2012, and entitled "APPARATUS AND METHODS FOR EFFICIENT UPDATES IN SPIKING NEURON NETWORK", each of the foregoing being incorporated herein by reference in its entirety.

The synaptic variables of a spiking network may be stored and addressed using pre-synaptic indexing e.g., as described in commonly owned U.S. patent application Ser. No. 13/239,259, filed Sep. 21, 2011 and entitled "APPARATUS AND METHOD FOR PARTIAL EVALUATION OF SYNAPTIC UPDATES BASED ON SYSTEM EVENTS", the foregoing being incorporated herein by reference in its entirety. For example, as described therein, in a pre-synaptic network, the synaptic variables corresponding to synaptic connections that deliver outputs from a given pre-synaptic unit are stored in a pre-synaptically indexed memory (that is based, for example, on the pre-synaptic unit ID).

The plasticity rule of a given connection may be configured for execution based on an event (e.g., a spike generation) of the pre-synaptic unit associated with the given connection. For instance, responsive to unit 122 generating a spike, the plasticity rule execution for the connection 132 is triggered.

The network 100 may be configured to generate an output signal (e.g., comprising an object detection indication) based on the sensory input 108 comprising object representation. In one or more implementations, the detection signal generation may be based on an error signal provided by a neuron of a subsequent layer to a neuron from the preceding layer.

Figure 2:
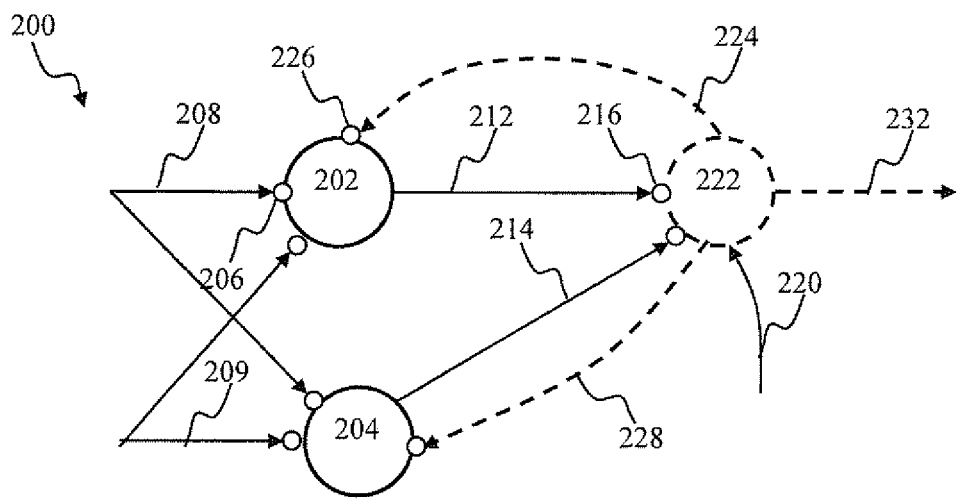
FIG. 2 is a block diagram depicting a spiking neuron network configured for error back propagation, in accordance with one or more implementations.

FIG. 2 is a block diagram depicting a spiking neuron network configured for error back propagation, in accordance with one or more implementations. The network 200 may comprise two layers of spiking neurons: layer one (or layer x) comprising neurons 202, 204; and layer two (or layer y), comprising neuron 222. The first layer neurons 202, 204 may receive input 208, 209 and communicate their output to the second layer neuron 222 via connections 212, 214.

State parameters of neurons 202, 204 may be updated based on the inputs 208 and 209. In one or more implementations, excitability u of the $j^{th}$ neuron at time t may be determined as follows:

$$u_j^x(t) = \Sigma_i^N w_{i,j}^x x_i^{in}, \qquad (\text{Eqn. 1})$$

where:

$x_i^{in}$ denotes the $i^{th}$ input into the layer x neuron;

$w_{i,j}^x$ denotes efficacy associated with the $i^{th}$ connection into the $j^{th}$ neuron of layer x; and $u_j^x(t)$ denotes excitability of the $j^{th}$ neuron in layer x of the network at time t.

Various neuron dynamic processes may be utilized with the methodology of the present disclosure. Neuron dynamic processes may include e.g.: integrate-and-fire (IF), spike response process (SRP), stochastic process such as, for example, described in commonly owned U.S. patent application Ser. No. 13/487,533, entitled "SYSTEMS AND APPARATUS FOR IMPLEMENTING TASK-SPECIFIC LEARING USING SPIKING NEURONS" filed Jun. 4, 2012, incorporated herein by reference in its entirety. In some implementations, the network may comprise a heterogeneous neuron population comprising neurons of two or more types governed by their respective processes. In exemplary SRP based implementations, a neuron of layer x may produce a response $x_j^{out}(t)$ based on the excitability breaching response generation (firing) threshold, determined as follows.

$$x_j^{out}(t) = sigm(u_j^x(t)). \qquad (\text{Eqn. 2})$$

In one such implementation, the threshold may comprise the value of zero and the neuron generates output when the result is greater than zero.

Referring back to FIG. 2, the second layer neuron 222 may determine an output 232 corresponding to e.g., a feature being detected in output $x_j^{out}(t)$ of the first layer neurons 202, 204. During operation, the state parameters of the second layer neuron 222 may be updated based on inputs 212, 214. In one or more implementations, excitability u of $j^{th}$ neuron of the layer y at time t may be determined as follows:

$$u_j^y(t)\Sigma_i^N w_{i,j}^y y_i^{in}, y_j^{in}(t)=x_j^{out}(t) \tag{Eqn. 3}$$

where:
- $y_i^{in}$ denotes the $i^{th}$ input into the layer y neuron;
- $w_{i,j}^y$ denotes efficacy associated with the $i^{th}$ connection between the $i^{th}$ x layer neuron and the $j^{th}$ neuron of layer y; and
- $u_j^y(t)$ denotes excitability of the $j^{th}$ neuron in layer y of the network at time t.

In exemplary SRP based implementations, a neuron of layer y (e.g., the neuron 222) may produce a response $y_j^{out}(t)$, determined as follows:

$$y_j^{out}(t)=\text{sigm}(u_j^y(t)) \tag{Eqn. 4}$$

The second layer neurons (e.g., the neuron 222) may also determine a feedback signal. The feedback signal may be communicated from the second layer neuron to the first layer neurons (e.g., neurons 202, 204 via connections 224, 228). The feed-forward connections (e.g., 208, 209, 212, 214) and the feedback connections (e.g., 224, 228) of a network may be characterized by connection efficacy (as shown in FIG. 2, denoted by open circles 206, 216, 226).

In some embodiments, the feedback signal may comprise an error signal. In one or more implementations the error signal may be configured based on a teaching signal (e.g., 220) comprising a target signal that represents an expected result (e.g., a "correct" answer in an object classification application). The error signal may be configured based on an absolute difference (or distance) between the teaching signal $y_j^d$ and the layer y output, e.g., as follows:

$$e_j^y(t)=|y_j^d-y_j^{out}(t)|^2 \tag{Eqn. 5}$$

where: $e_j^y(t)$ denotes the error signal associated with the $j^{th}$ neuron at time t. An error signal produced by a neuron may be utilized by the network in order to adjust efficacy of connections into that layer. For example, the y-layer efficacy adjustment $\Delta w_{i,j}^y$ may be determined as follows:

$$\Delta w_{i,j}^y=\gamma_1 e_j^y(t)y_i^{in}(t) \tag{Eqn. 6}$$

where $\gamma_1$ denotes a learning rate. In one or more implementations, the learning rate $\gamma$ may comprise a function of time and/or other parameters.

The error signal produced by a subsequent layer neuron (e.g., $e_j^y(t)$ of Eqn. 5 as applied to the layer y neuron 222 in FIG. 2) may be utilized by the network to adjust the efficacy of connections into a prior network layer (e.g., the layer x neurons 202, 204 in FIG. 2). In one or more implementations, the efficacy adjustment $\Delta w_{i,j}^x$ may be determined as follows:

$$\Delta w_{i,j}^x=\gamma_2 e_j^x(t)x_i^{in}(t) \tag{Eqn. 7}$$

where:
- $\gamma_2$ denotes the layer x learning rate;
- $x_i^{in}(t)$ denotes the input into x-layer neuron at time t; and
- $e_i^x(t)$ denotes the x-layer error measure.

In one or more implementations of error back propagation, x-layer error may be described as:

$$e^x=(w^y)^T e^y, \tag{Eqn. 8}$$

where:
- $(w^y)^T$ denotes y-layer transposition of feed forward connection efficacy array $w^y$; and
- $e^y$ denotes the y-layer error measure (e.g., of Eqn. 5).

The excitability adjustment of y-layer neurons (e.g., of Eqn. 3) may be expressed as:

$$u^y=w^y x^{out}, \tag{Eqn. 9}$$

Operations of Eqn. 8 may be implemented by the x-layer neurons (for example, in FIG. 2 neuron 202). Operations of Eqn. 9 may be implemented by y-layer neuron (for example, in FIG. 2 neuron 222). Comparing Eqn. 8 with Eqn. 9, both expressions utilize weight matrix $w^y$. In one or more implementations of parallel networks, efficacy associated with connections into a neuron may be stored by that neuron (e.g., the neuron 222 may be configured to store efficacy 216). In order to determine layer x error, the layer y efficacy array may be made available to neurons of layer x. Communicating efficacy array values from one layer to a prior layer may impose a substantial communication load on processing apparatus and/or bus traffic. For example, as described subsequently hereinafter, parallel networks can be made of very large numbers of neurons (thousands to millions) and connections (thousands to millions).

In order to reduce processing and/or communications load associated with implementing back propagation of errors in parallel networks, the efficacy $\Delta \hat{w}^y$ of the feedback connections (224) may be utilized in Eqn. 8 in place of the feed forward efficacy array $w^y$. For example, the x-layer error may be determined as:

$$e_i^x(t)=\Sigma_j^N \hat{w}_{i,j}^y e^y(t) \tag{Eqn. 10}$$

Eqn. 10 $\Delta \hat{w}_{i,j}^y$ denotes efficacy adjustment of feedback connections between layers y and x. In one or more implementations, the feedback connection efficacy adjustment $\Delta \hat{w}_{i,j}^y$ may be determined as follows:

$$\Delta \hat{w}_{i,j}^y=\gamma_3 e_j^y(t)x_i^{out}(t). \tag{Eqn. 11}$$

where: $\gamma_3$ denotes learning rate for feedback connection adaptation. In one or more implementations, the learning rates $\gamma_1$, $\gamma_2$, $\gamma_3$ may be configured differently from one another. In some implementations, a given learning rate may be utilized through the network or a portion of the network. In some implementations, the learning rate may be selected from a range between $10^{-5}$ and 1, inclusive. The learning rate may be used to determine magnitude of learning parameter adjustment at a given iteration of network operation (e.g., given update). Larger value of learning rate (e.g., 1) may correspond to faster learning. Smaller value of learning rate ($10^{-5}$) may correspond to slower learning and/or lower errors. In one implementation, connection efficacy adjustment may be performed as:

$$w(t+\Delta t)=w(t)+\Delta w \tag{Eqn. 12}$$

where: $w(t+\Delta t)$ denotes updated connection efficacy at time $(t+\Delta t)$, $w(t)$ denotes efficacy at time t and $\Delta w$ denotes the adjustment amount e.g., obtained using Eqn. 6, Eqn. 7, or Eqn. 11.

Figure 3A:
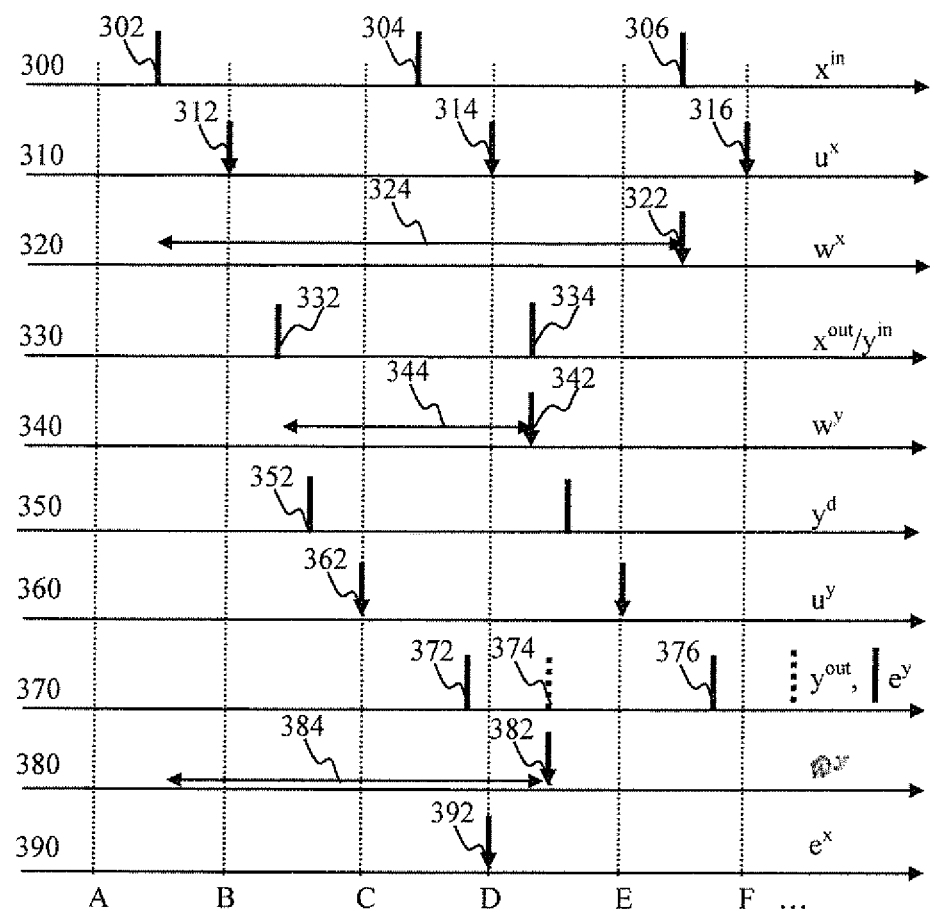
FIG. 3A is a timing diagram illustrating data communication in the network of FIG. 2 configured for error back propagation based on a pre-synaptic event associated with that connection, in accordance with one or more implementations.
Figure 3B:
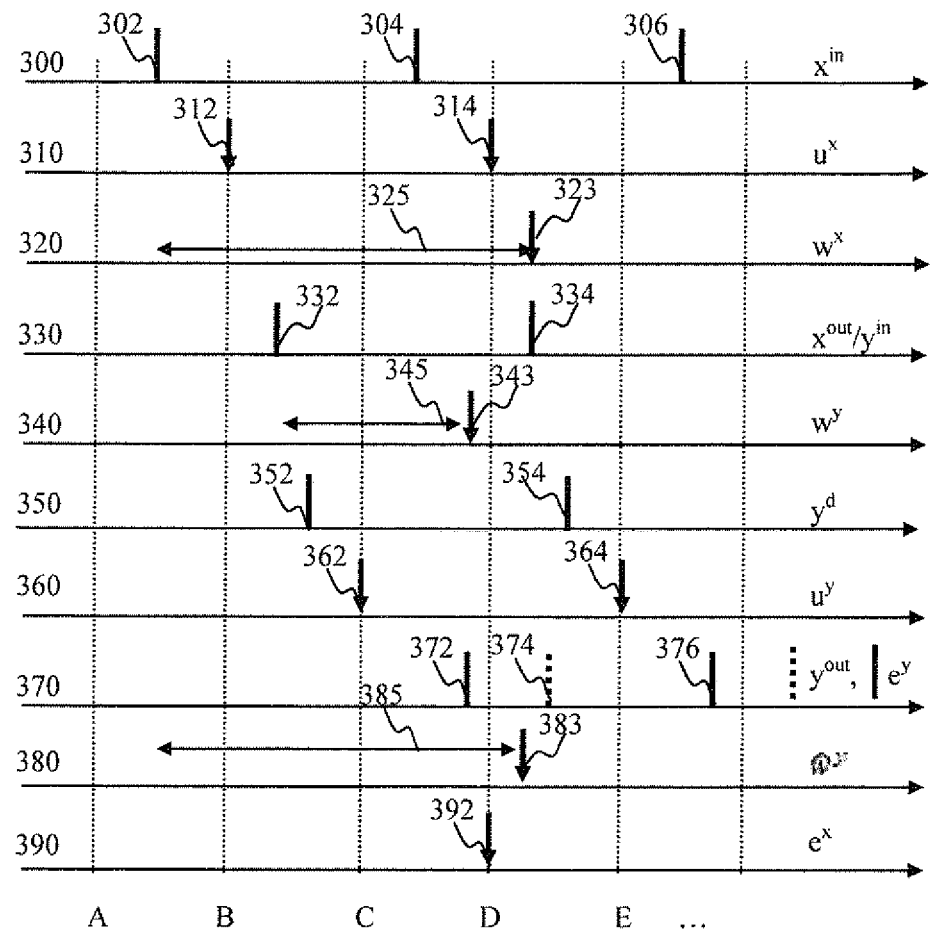
FIG. 3B is a timing diagram illustrating data communication in the network of FIG. 2 configured for error back propagation based on a post-synaptic event associated with that connection, in accordance with one or more implementations.

FIGS. 3A-3B present timing diagrams illustrating efficacy adjustment and data communication for the network of FIG. 2 configured for error back propagation. As shown in FIG. 3A, efficacy adjustment of a given connection may be effectuated based on a pre-synaptic event associated with that connection. Similarly, as shown in FIG. 3B, efficacy adjustment of a given connection may be effectuated based on a post-synaptic event associated with that connection. As used herein, the preceding neuron layer (e.g., comprised of neurons 202, 204 in FIG. 2) may be referred to as the x-layer; the subsequent neuron layer (e.g., comprised of neuron 222 and/or other neurons not shown in FIG. 2) may be referred to as x-layer.

In FIGS. 3A-3B, traces 300, 301 depict inputs into a layer x neuron (e.g., spiking activity on connections 208 or 209 into neuron 202/204); traces 310, 311 depict the timing of layer x updates (comprising e.g., updates of the neuron 204 excitability and/or other operations); traces 320, 321 depict the efficacy update of x-layer feed-forward connections (e.g., efficacy 206 of connection 208) and/or other operations; traces 330, 331 depict a layer x output corresponding to a layer y input; traces 340, 341 depicts the efficacy update timing for y-layer feed-forward connections (e.g., efficacy 216 of connection 212) and/or other operations; traces 350, 351 depicts training input (e.g., 220) into the layer y neuron(s); traces 360, 361 depicts timing of layer y updates (comprising e.g., updates of the neuron 222 excitability $u^y$, and/or other operations); traces 370, 371 depicts feedback connection activity (e.g., solid line denoting error feedback $e^y$ spike) and control output y (e.g., 232) activity (broken line); traces 380, 381 depicts efficacy adaptation timing for feedback connections from layer y to layer x (e.g., 214) and layer y output; and traces 390, 391 depicts timing of layer x error $e^x$ determination responsive to the layer y feedback and/or other operations. In FIGS. 3A-3B, vertical bars (e.g., 302, 303) denote timing spike occurrence whereas vertical arrows (e.g., 312, 313) denote timing of computations.

Referring now to FIG. 3A, transactions within a spiking neuron network (e.g., the network 200 of FIG. 2) configured for error back-propagation with efficacy updates being performed based on a pre-synaptic event are graphically illustrated. In one or more implementations, the network operation shown in FIG. 3A may be implemented using a hardware compliant high level neuromorphic language description (HC-HLND), e.g., as described in commonly owned U.S. patent application Ser. No. 14/020,376, filed Sep. 6, 2013 and entitled "APPARATUS AND METHODS FOR EVENT-BASED PLASTICITY IN SPIKING NEURON NETWORKS", incorporated herein by reference in its entirety.

As shown, during the time interval between time instances A and B, input $x^{in}$ may be provided to one or more x-layer neurons. The input 300 may comprise a plurality of spikes generated based on sensory input. The sensory input may comprise, for example, an audio signal, a stream of video frames, and/or other input. In some implementations, (such as described with respect to FIG. 9, described hereinafter) the sensory input may comprise image frames received from an image sensor (such as a charge-coupled device (CCD), CMOS device, and/or an active-pixel sensor (APS), photodiode arrays, etc.). In one or more implementations, the input may comprise a pixel stream downloaded from a file, such as a stream of two-dimensional matrices of red green blue (RGB) values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, etc.) are equally applicable to and useful with the various aspects of the present disclosure. Furthermore, data frames corresponding to other (non-visual) signal modalities such as sonograms, IR, radar or tomography images are equally compatible with the processing methodology of the disclosure, or yet other configurations.

In one or more implementations, the input 300 may correspond to an input image frame encoded into spikes, using latency encoding methodology. Pixel data may include data conveying information associated with one or more of RGB, CMYK, HSV, HSL, grayscale, and/or other information. In one or more implementations, the encoding may comprise one or more methodologies described, for example, in commonly owned U.S. patent application Ser. No. 13/540,429, filed Jul. 2, 2012 and entitled "SENSORY PROCESSING APPARATUS AND METHODS", Ser. No. 13/623,820, filed Sep. 20, 2012 and entitled "APPARATUS AND METHODS FOR ENCODING OF SENSORY DATA USING ARTIFICIAL SPIKING NEURONS", Ser. No. 13/623,838, filed Sep. 20, 2012 and entitled "SPIKING NEURON NETWORK APPARATUS AND METHODS FOR ENCODING OF SENSORY DATA", and Ser. No. 13/152,105 entitled "APPARATUS AND METHODS FOR TEMPORALLY PROXIMATE OBJECT RECOGNITION" filed on Jun. 2, 2011, and U.S. Pat. No. 8,315,305, entitled "SYSTEMS AND METHODS FOR INVARIANT PULSE LATENCY CODING" issued Nov. 20, 2012, each of the foregoing being incorporated herein by reference in its entirety. In some implementations the input may include data conveying information associated with one or more of levels of activations of Gabor filters for face recognition, contours, and/or other information.

In robot navigation implementations, the input 300 may convey information associated with one or more of: proximity, inertial, terrain imaging, etc. In some implementations, the input data may include data conveying information associated with one or more of: velocity, information extracted from accelerometers, detected distances from obstacles, positions, and/or other information. In one or more implementations comprising image latency encoding, the time interval between time instances A and B may be selected to match input refresh rate (e.g., 40 ms for a video input or other applicable refresh rate for other sensory data types).

At time instance B, the x-layer neuron excitability may be updated based on the occurrence of the input spike 302 during the preceding time interval (A-B). In one or more implementations, the x-layer neuron update may be configured based on Eqn. 1. In some implementations, at time instance B, output of x-layer neurons may be determined using e.g., Eqn. 2.

During the time interval between time instances B and C, output $x^{out}$ may be provided to one or more y-layer neurons (222) via one or more connections (e.g., 212, 214). In some implementations, the output $x^{out}$ may comprise one or more spikes (e.g., 312 shown on trace 310). The output 310 may be configured to convey information associated with, e.g., a representation of an object being detected in the input 300. During the time interval between time instances B and C, teaching (training) signal $y^d$ may be provided to one or more y-layer neurons (e.g., neuron 222 via the connection 220). In some implementations, the training input $y^d$ may comprise one or more spikes (e.g., 332 shown on trace 330). The training signal may correspond, in some classification implementations, to a 'label' associated with the input object being classified (e.g., a triangle or a square) or the correct parameter. In one or more implementations of a binary classifier, the training signal may comprise labels 'YES'/'NO' and/or '1'/'0'.

At time instance C, the y-layer neuron excitability may be updated based on the occurrence of the input spike 332 during the preceding interval (between time instance B and C). In one or more implementations, the y-layer neuron update may be configured based on Eqn. 3. In some implementations, at time instance C, the output of y-layer neurons may be determined using e.g., Eqn. 4. At time instance C, teaching input $y^d$ may be decoded by one or more neurons of y-layer. In some implementations of supervised learning that are configured based on timing of the teaching signal, latency of the teaching signal spike may be determined. In one or more implementations of spike latency encoding, the teaching spike latency may be converted into a target output value $y^d$. In one or more implementations, the target output may correspond to a motor command (e.g., activate right wheel motor with a specified torque), a correct answer to a classification question (e.g., object or person name), etc.

Based on values of neuron output $y^{out}$ and the target output $y^d$ an error associated with the y-layer output determination may be obtained. In some implementations, the error $e^y$ may comprise the error measure of Eqn. 5. Based on the error measure e efficacy adjustment parameter $\Delta w^y$ for layer y input connections (e.g., 212, 214 in FIG. 2) may be determined at time instance C. In implementations configured to implement efficacy update based on a pre-synaptic event, the efficacy adjustment parameter $\Delta w^y$ may be cached by a respective neuron (e.g., 222) until occurrence of a pre-synaptic event subsequent to time instance C. For the layer y input connection, the pre-synaptic event may comprise an output provision by x-layer neuron (e.g., spikes 332, 334 in FIG. 3A). The spike 332 occurs prior to time instance C wherein $\Delta w^y$ may become available. Accordingly, efficacy update for connections from layer x to layer y (e.g., 212, 214) may be triggered based on the spike 334, as shown by the update event 342. As shown in FIG. 3A, efficacy update 342 corresponding to the input 332 into the layer y neuron occurs after time interval 344 subsequent to the input 332. The update delay 344 may be taken into account when implementing learning using spiking networks that operate in accordance with the error back propagation methodology described herein.

During the time interval between time instances C and D, the layer y output $y^{out}$ or the error $e^y$ may be provided by the one or more y-layer neurons (e.g., 222 via one or more connections 232 or 224/226, respectively). In one or more implementations, the error feedback may be encoded using spike latency, as shown and described with respect to FIGS. 4A-B, below.

In the implementations illustrated in FIGS. 3A-3B, the output/error provision by the y-layer neuron is time multiplexed such that at one time interval (e.g., the time interval between time instances C and D) the error signal may be provided, as illustrated by solid bar 372. At a subsequent time interval (e.g., between time instances D and E) the output $y^{out}$ may be provided, as illustrated by broken line bar 374 in FIG. 3A. The output 374 may be configured to convey information associated with e.g., a feature associated with object being detected in the input 300 (e.g., object orientation, color, shape, type, and/or other characteristic). In one or more implementations, the output $y^{out}$ may be produced using Eqn. 4. In one or more implementations, the output $y^{out}$ may comprise a motor control command provided to a motor actuator and/or other portions of the network. The network may be configured to implement signal de-multiplexing so as to distinguish between the error output (372) and the control output (374). In some implementations, the demultiplexing methodology may be configured based on even/odd time slots (e.g., intervals B-C, C-D, and/or other), wherein an even (or odd) timeslot (e.g., C-D) may be used to communicate the error (e.g., the spike 372); and an odd (or even) timeslot (e.g., D-E) may be used to communicate the output signal $y^{out}$ (e.g., the spike 374).

At time instance D, layer y error feedback $e^y$ may be decoded by a respective x-layer neuron (e.g., the neuron 202 may decode the error provided by the neuron 222 via the connection 224). In some implementation of latency error encoding, the error decoding may comprise determination of the spike 372 latency. The latency value may be converted into a value of error using any applicable methodologies including those described herein. In some implementation, the layer y error feedback $e^y$ (e.g., shown by bar 372) may comprise multiple spikes. Latency of individual spikes within the signal 372 may correspond to one or more bits of an n-ary encoding scheme, e.g., as shown and described with respect to FIG. 4B, below.

At time instance D layer x error $e^x$ may be determined based on the decoded layer y error feedback $e^y$ and feedback connection efficacy $\Delta \hat{w}_{i,j}^{w}$. In FIG. 3A, timing of x layer error $e^x$ determination is shown by arrow 392. In one or more implementations, the error $e^x$ determination may be effectuated using Eqn. 10.

Based on the updated value of the x layer error, at time instance D efficacy adjustment $\Delta w^x$ for connections providing input into neuron of layer x may be determined. In one or more implementations, the efficacy adjustment $\Delta w^x$ determination may be effectuated using Eqn. 7. In some implementations configured to implement efficacy update based in a pre-synaptic event, the efficacy adjustment parameter $\Delta w^x$ may be cached by a respective neuron until occurrence of a relevant pre-synaptic event subsequent to time instance D. For the layer x feed forward connection, the pre-synaptic event may comprise occurrence of input spikes on trace 300, e.g., spikes 302, 304, 306. Efficacy adjustment (as shown by arrow 322 on trace 320) for layer x input connections may be performed based on occurrence of an input spike (e.g., 306) event subsequent to time instance D. As shown in FIG. 3A, the efficacy update 322 corresponding to the input 302 occurs after time interval 324 subsequent to the input spike 302. The update delay 324 may be taken into account when implementing learning using spiking networks operable in accordance with the error back propagation methodology described herein. In order to ensure availability of the input 302 at the time of the update 322, the input 302 may be cached.

The excitability update of x-layer neurons responsive to input 304 and shown by arrow 314 in FIG. 3A may be performed based on feed forward connection efficacy value $w_{i,j}^x$ available at time instance B. The excitability update responsive to input 306 and shown by arrow 316 in FIG. 3A may be performed based on the updated (at instance 322) feed forward connection efficacy value, as follows:

$$u_j^x(t+\Delta t)=\Sigma_i^N(w_{i,j}^x+\Delta w_{i,j}^x)x_i^{in}(t+\Delta t), \qquad \text{(Eqn. 13)}$$

Based on the decoded value of the y layer error, at time instance D efficacy adjustment $\Delta \hat{w}^y$ for feedback connections providing feedback from layer y neuron(s) to layer x neurons may be determined. In one or more implementations, the efficacy adjustment $\Delta w^y$ determination may be effectuated using Eqn. 11. In some implementations configured to implement efficacy update based in a pre-synaptic event, the efficacy adjustment parameter $\Delta w^y$ may be cached by a respective neuron until occurrence of a relevant pre-synaptic event for the feedback connection(s) subsequent to time instance D. For the layer x feedback connection, the relevant pre-synaptic event may comprise output provision by the layer y neuron. The neuron output may comprise one of (i) error $e^y$ output (e.g., 372, 376); or output $y^{out}$ (e.g., 374). Efficacy adjustment (as shown by arrow 382 on trace 380) for layer x feedback connections may be performed based on occurrence of one or more spikes (e.g., 374) subsequent to time instance D. As shown in FIG. 3A, efficacy update 382 corresponding to the input 302 occurs after time interval 384 subsequent to the input spike 302 into neuron 202. The update delay 384 may be taken into account when implementing learning using spiking networks operable in accordance with the error back propagation methodology described herein.

FIG. 3B illustrates efficacy updates in a spiking neuron network configured based on a post-synaptic event), in accordance with one or more implementation.

For the layer y input connection, the post-synaptic event may comprise an output provision by y-layer neuron, e.g., the y error $e^y$ 373, 377 or $y^{out}$ 375 in FIG. 3B. The output 373 occurs subsequent to time instance C wherein $\Delta w^y$ may become available. Accordingly, efficacy update for connections from layer x to layer y may be triggered based on the one or more spikes 373, as shown by the update event 343 in FIG. 3B. As shown in FIG. 3B, efficacy update 343 corresponding to the input 333 into the layer y neuron occurs after time interval 345 subsequent to the input 333.

For the layer x feedback connection, the post-synaptic event may comprise provision of output by the y-layer neuron, shown by spikes 333, 335. Efficacy adjustment (as shown by arrow 323 on trace 321 in FIG. 3B) for layer x input connections may be performed based on occurrence of output spike (e.g., 335) subsequent to time instance D. As shown in FIG. 3B, efficacy update 323 corresponding to the input 303 occurs after time interval 325 subsequent to the input spike 303.

For the layer x feed forward connection, the post-synaptic event may comprise provision of output by the x-layer neuron e.g., spikes 333, 335 in FIG. 3B. The output 335 occurs subsequent to time instance D when the value of $\Delta \hat{w}^y$ may become available. Accordingly, an efficacy update for feedback connections from layer y to layer x may be triggered based on the one or more spikes 335, as shown by the update event 383 in FIG. 3B. As shown in FIG. 3B, efficacy update 383 corresponding to the input 303 into the layer x neuron occurs after time interval 385 subsequent to the input 303. The update delays 325, 345, 385 may be taken into account when implementing learning using spiking networks that operate in accordance with the error back propagation methodology described herein.

At time instance D of FOG. 3B, layer y error feedback $e^y$ may be decoded by a respective x-layer neuron (e.g., the neuron 202 may decode the error provided by the neuron 222 via the connection 224). In some implementation of latency error encoding, the error decoding may comprise determination of the spike 373 latency. The latency value may be converted into a value of error using any applicable methodologies including those described herein. In some implementation, the layer y error feedback $e^y$ (e.g., shown by bar 373) may comprise multiple spikes. Latency of individual spikes within the signal 373 may correspond to one or more bits of an n-ary encoding scheme, e.g., as shown and described with respect to FIG. 4B, below.

At time instance D layer x error $e^x$ may be determined based on the decoded layer y error feedback e and feedback connection efficacy $\Delta \hat{w}_{i,j}^y$. In FIG. 3B, timing of x layer error $e^x$ determination is shown by arrow 393. In one or more implementations, the error $e^x$ determination may be effectuated using Eqn. 10.

Error $e^y$ that may be communicated from a y-layer neuron to an x-layer neuron may comprise real values. As used herein the term real value, float value, continuous value, and/or analog value may be used to describe a discrete and/or continuous signal that is not a pulse (e.g., not a spike). In order to communicate non-spiking data from one spiking neuron to another spiking neuron an encoding mechanism may be utilized that communicates a value encoded into one or more spike parameters. In one or more implementations, value encoding may comprise spike latency encoding, number of spikes (e.g., pulse density modulation (PDM)), spike width (e.g., pulse width modulation (PWM)), mean spike rate, and/or other mechanisms.

Figure 4A:
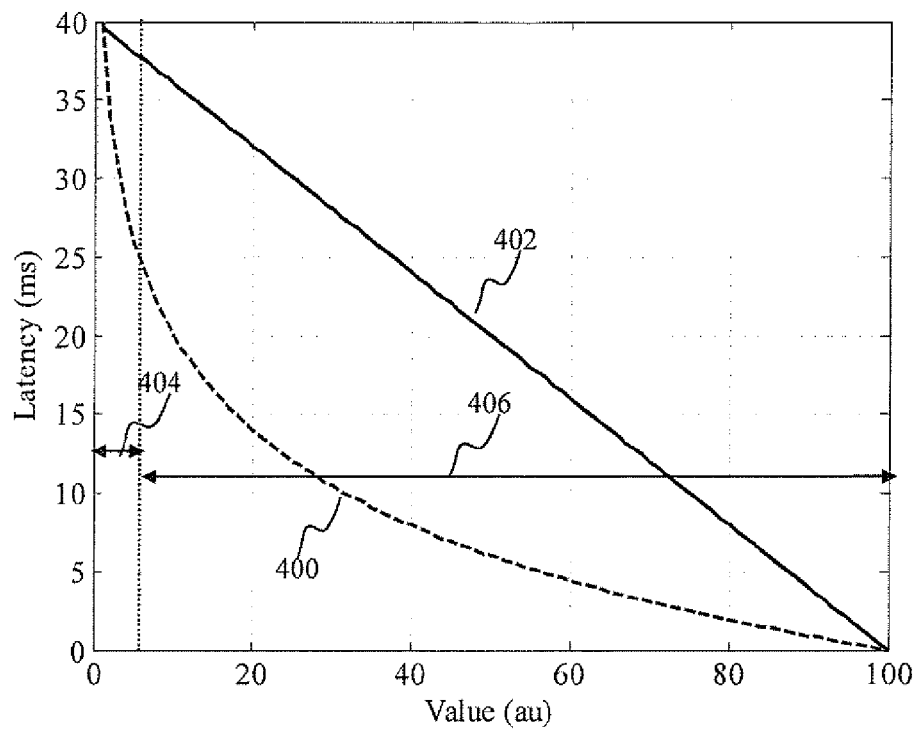
FIG. 4A is a plot illustrating a first scheme for real value encoding into spike latency for use with error back propagation, in accordance with one or more implementations.

FIG. 4A is a plot illustrating encoding of a real value into spike latency for use with the error back propagation, in accordance with one or more implementations. Curve 400 depicts linear encoding wherein latency lat is determined based on a linear function of input value I, e.g., as follows:

$$lat(I) = \left(1 - \frac{I}{I_{max}}\right) * \text{max}Lat \quad \text{(Eqn. 14)}$$

where:
  maxLat denotes maximum value of latency; and
  Imax denotes maximum input value I.

Curve 402 depicts a log-encoding wherein latency/at is determined based on a logarithm function of input value I, e.g., as follows:

$$lat(I) = \left(1 - \frac{\log_n(I)}{L_{max}}\right) * \text{max}Lat \quad \text{(Eqn. 15)}$$

where:
  maxLat denotes maximum value of latency; and
  $L_{max}$ denotes a maximum value of log, (I).

For example, in one such case, linear latency coding may be used to produce latency values of 0 ms for the maximum input value (e.g., normalized value of 1.0); latency values of 20 ms (e.g., the normalized value 0.5), and a latency of 40 ms (e.g., for the input value of 0).

Figure 4B:
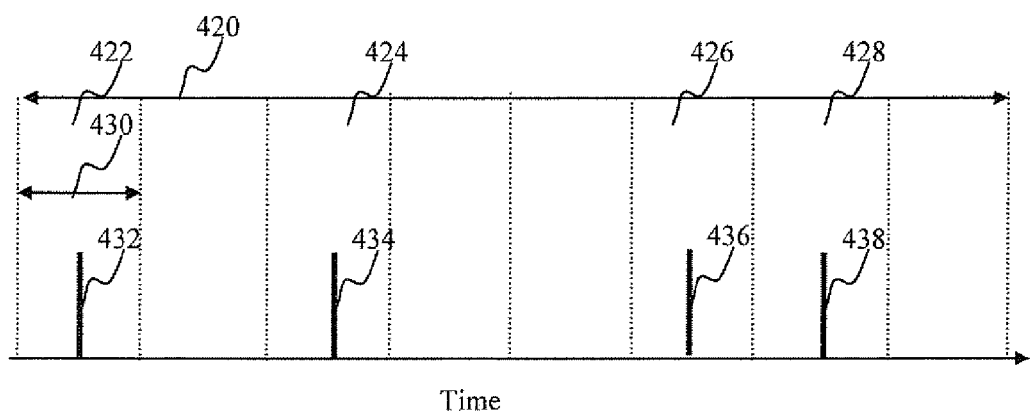
FIG. 4B is a plot illustrating a second scheme for real value encoding into latency of multiple spikes for use with error back propagation, in accordance with one or more implementations.

FIG. 4B is a plot illustrating encoding of a real value into multiple spikes for use with error back propagation, in accordance with one or more implementations. Arrow 420 in FIG. 4B denotes an encoding interval. In some implementations, the encoding interval 420 may correspond to an interval associated with the input refresh rate (e.g., 40 ms) and/or interval configured for propagating spiking signals within the network (e.g., intervals A-B, B-C in FIG. 3A). The interval 420 may be partitioned into two or more portions e.g., eight portions in the implementation illustrated in FIG. 4B. In one or more implementations, partitioning may comprise even and/or uneven intervals. In one such case, the uneven intervals are logarithmically spaced or spaced according to a power law. Spikes (e.g., 432, 434, 436, 438 in portions 422, 424, 426, 428) may be used to encode bit values. In some implementations, occurrence of a spike within a given interval (e.g., spike 432 in the interval 422) may signify a nonzero bit value (e.g., the spike 422 may correspond to most significant bit).

Figure 4C:
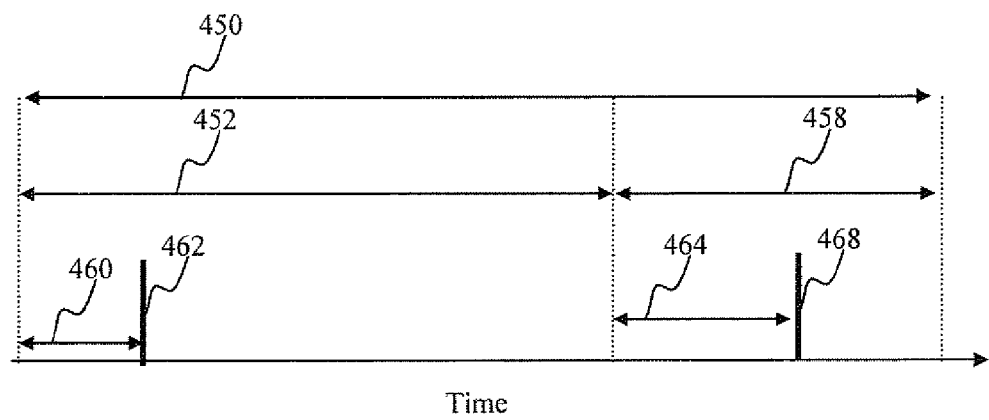
FIG. 4C is a plot illustrating a hybrid scheme for real value encoding into latency of multiple spikes for use with error back propagation, in accordance with one or more implementations.

FIG. 4C is a plot illustrating a hybrid encoding method for use with error back propagation, in accordance with one or more implementations. Arrow 450 in FIG. 4C denotes an encoding interval. The interval 450 may be partitioned into two or more portions e.g., portions 452, 454 in the implementation illustrated in FIG. 4C. In one or more implementations, the portions 452, 454 may comprise equal duration or unequal duration. A range of values being encoded may be partitioned into two or more sub-ranges (similar to 404, 406 in FIG. 4A). In one example, one interval (e.g., 452 in FIG. 4C) may be utilized to encode the values in the subrange 404 in FIG. 4A (e.g., lower magnitude values compared to the subrange 406). The other interval (e.g., 454 in FIG. 4C) may be utilized to encode the values in the subrange 406 in FIG. 4A (e.g., greater magnitude values compared to the subrange 404 FIG. 4A). The encoding associated with the portion 452 may comprise linear encoding configured to preserve resolution of the smaller magnitude values of the subrange 404 FIG. 4A. The encoding associated with the portion 454 in FIG. 4C may comprise logarithmic encoding configured to obtain greater dynamic range compared to the linear encoding. It will be appreciated by those skilled in the arts that various other encoding schemes may be utilized with the present disclosure, such as, for example Grey encoding, partial interval encoding, etc. Moreover, so-called "piece-wise" functions may incorporate distinct schemes over different ranges. For example, the latency range of [0, 20] may be used to encode higher bits via logarithmic encoding, while latency range [20, 40] may be used to encode lower bits via linear encoding, etc.

In some implementations of parallel networks comprising a neuron with multiple output connections, the neuron may be configured to cause a pre-synaptic event for one or more connections. Individual neurons may be configured to provide data to different destinations. For example, a first connection may provide the error feedback to a neuron from a preceding layer. The second neuron may provide feed forward signal to a network portion downstream from the neuron e.g., a motor command to a motor actuator. In order to effectuate delivery of given data to a respective destination a time multiplexing method may be employed.

In one or more implementations, the time multiplexing may comprise alternate transmission of data over two or more time slots e.g., as shown in FIG. 3A. During one time interval (e.g., the interval C-D and/or E-F in FIG. 3A) one of the output parameters (e.g., the error $e^y$) may be provided via the output connections. During another time interval (e.g., the interval D-E in FIG. 3A) another output parameter (e.g., the motor output $y^{out}$) may be provided via the output connections.

In some implementations, the time multiplexing scheme may employ a flag, a semaphore, and/or another indicator configured to indicate a data type being communicated (e.g., error or output). In one or more implementations, the neuron may configure spiking output to encode a data type bit. For example, commonly owned U.S. patent application Ser. No. 13/868,944, filed Apr. 23, 2013 and entitled "EVENT-BASED COMMUNICATION IN SPIKING NEURON NETWORKS COMMUNICATING A NEURAL ACTIVITY PAYLOAD WITH AN EFFICACY UPDATE", the foregoing being incorporated herein by reference in its entirety, illustrates various implementations of using the spike payload for communicating data in a spiking neuron network.

Figure 5:
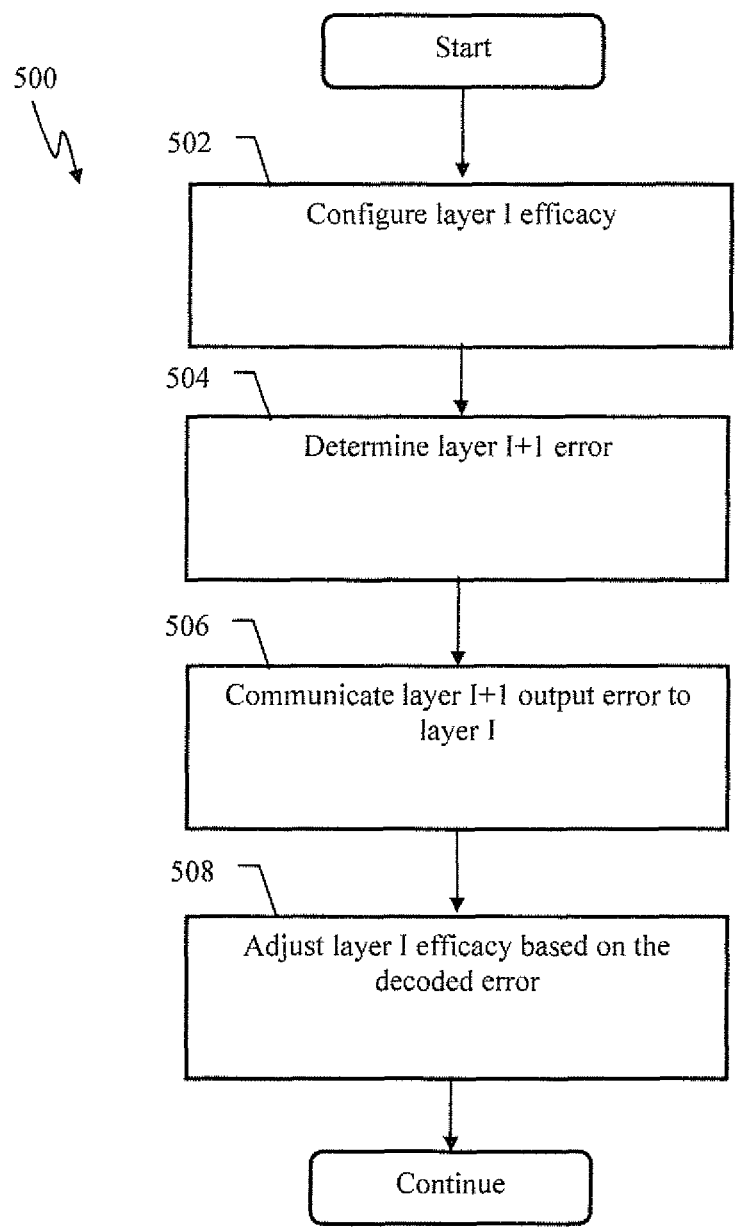
FIG. 5 is logical flow diagram illustrating a method of operating a multilayer spiking neuron network, in accordance with one or more implementations.
Figure 6:
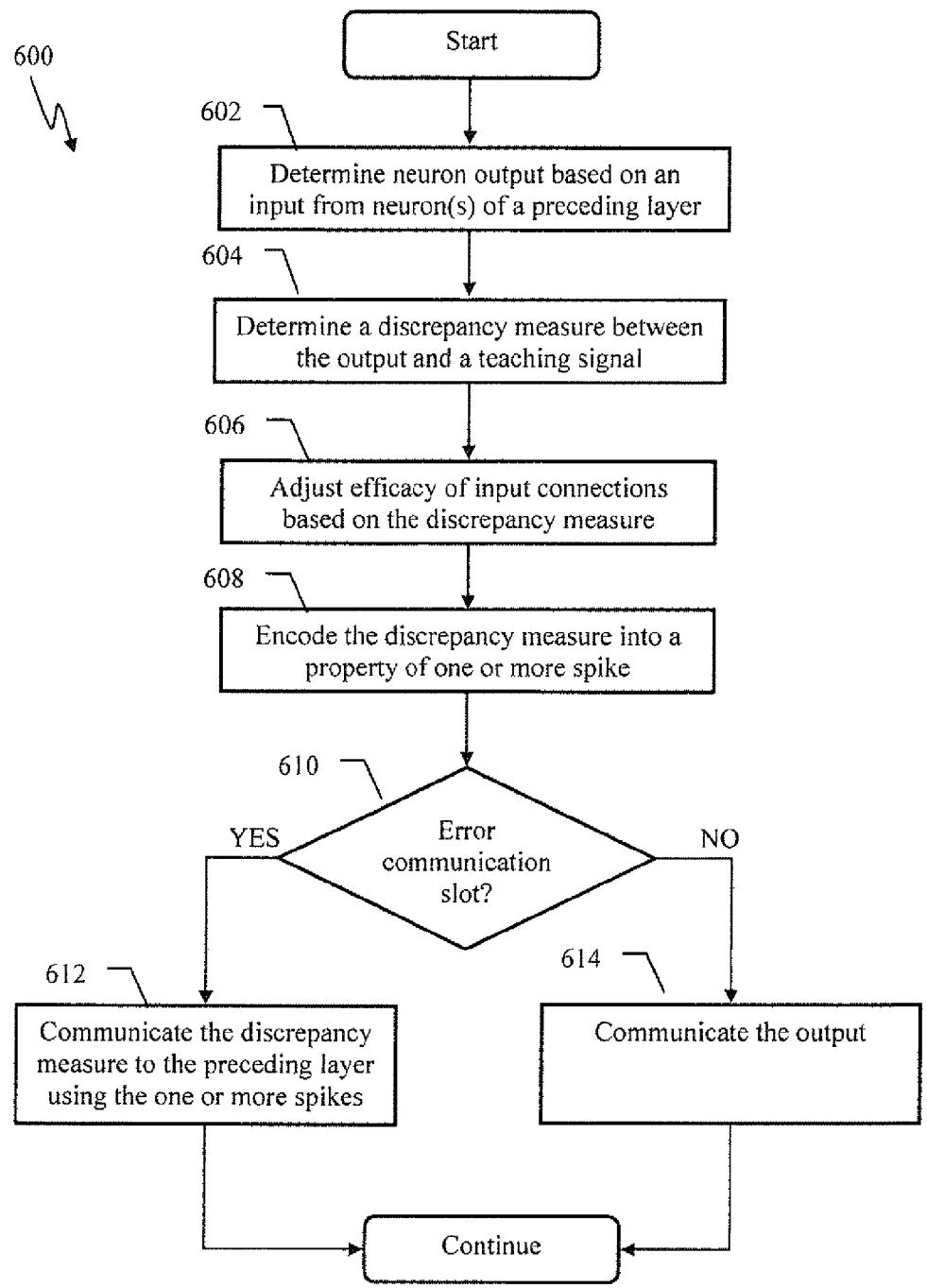
FIG. 6 is logical flow diagram illustrating a method of determining an error feedback by a layer of a spiking neuron network, in accordance with one or more implementations.
Figure 7:
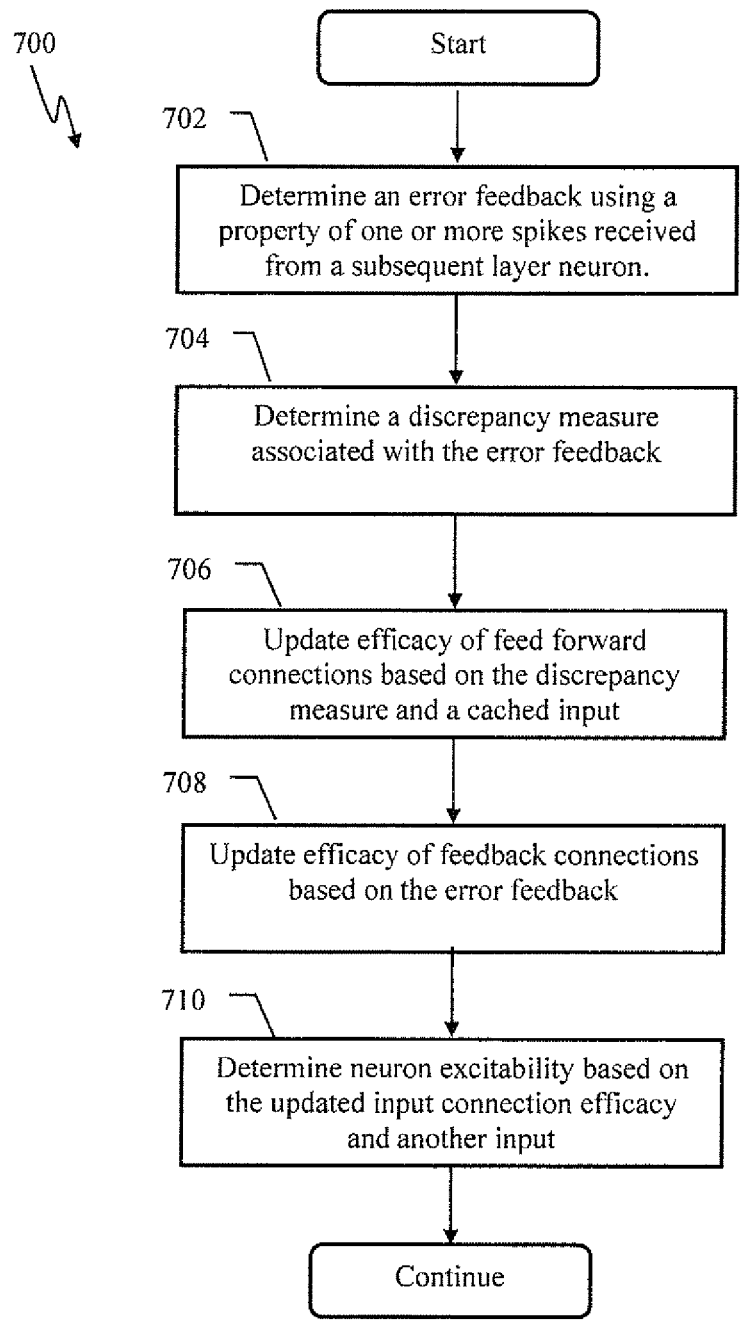
FIG. 7 is logical flow diagram illustrating a method of using the error feedback by a neuron of a spiking network, in accordance with one or more implementations.

FIGS. 5-7 illustrate methods 500, 600, 700 of implementing error back propagation in parallel spiking networks utilizing methodologies of the present disclosure. The operations of methods 500, 600, 700 presented below are intended to be illustrative. In some implementations, methods 500, 600, 700 may be accomplished with one or more additional operations not described and/or without one or more of the operations discussed with respect to FIGS. 5-7. Additionally, the order in which the operations of method 500, 600, 700 are illustrated in FIGS. 5-7 and described below is not intended to be limiting.

In some implementations, method 500, 600, 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 500, 600, 700 in response to instructions stored electronically on an electronic storage medium. The one or more processing devices may include one or more devices configured through hardware, firmware, and/or software to be specifically designed for execution of one or more of the operations of methods 500, 600, 700.

FIG. 5 illustrates a method 500 of operating a multilayer spiking neuron network, in accordance with one or more implementations. In some implementations, the network (e.g., the network 200) may comprise multiple interconnected nodes (e.g., neurons 202, 204, 222) operable by a parallel processing platform (e.g., the processing system 1150 of FIG. 11C).

At operation 502, efficacy of one or more connections providing input into one or more neurons of the network is configured. In one or more implementations, the one or more neurons may be referred to as layer "F". The efficacy may comprise connection synaptic weights, delays, probability of data transmission and/or other parameters. In some implementations, the efficacy configuration may comprise initializing efficacy array with a fixed and/or randomly selected (e.g., using a uniform normal distribution, etc.) It will be appreciated by those skilled in the arts that various other distributions may be utilized.

At operation 504, the layer I+1 error is determined. The layer I+1 may comprise one or more neurons configured downstream (e.g., configured to receive input) from layer I. In one or more implementations the error signal may be configured based on a teaching signal that represents an expected result (e.g., a "correct" answer in an object classification application). The error may be configured based on an absolute difference (or measured distance) between the teaching signal and the layer I+1 output.

At operation 506, the layer I+1 error is communicated to layer I. In one or more implementations, the error value may be encoded into spike latency using any of the applicable methodologies including e.g., those described above with respect to FIGS. 4A-4C.

At operation 508, the layer I efficacy of one or more connections (configured to provide input into layer I), is adjusted based on the decoded value of layer I+1 error. In one or more implementations, the efficacy adjustment may be configured based on Eqn. 8 and/or Eqn. 10, as described supra.

FIG. 6 illustrates a method 600 of determining an error feedback by a layer of a spiking neuron network.

At operation 602, the neuron output is determined based on an input from neuron(s) of a preceding layer of the network. In one or more implementations, the output may be determined based on efficacy of input connections into the neuron, e.g., as described with respect to Eqn. 3-Eqn. 4.

At operation 604, a measured discrepancy between the neuron output and a teaching signal is determined. In one or more implementations the teaching signal may comprise a target signal that represents an expected result (e.g., a "correct" answer in an object classification application). The measured discrepancy may be configured based on an absolute difference (or measured distance) between the teaching signal and the layer I+1 output.

At operation 606, the efficacy of input connections into the neuron is adjusted based on the discrepancy measure. In one or more implementations, the efficacy adjustment may be configured based on Eqn. 6 described above.

At operation 608, the measured discrepancy is encoded into a property of one or more spikes. In one or more implementations, the encoding may comprise latency and/or binary encoding e.g., as shown and described above with respect to FIGS. 4A-4B.

At operation 610, a determination may be made as to whether the current time slot of network operation corresponds to error communication slot. In one or more implementations, the operation 610 may be based on even/odd slot determination, flag, and/or other indication mechanism.

When the current time slot corresponds to an error communication slot, the method may proceed to operation 612 where the measured discrepancy is communicated to the preceding layer. In one or more implementations, the discrepancy communication may comprise transmitting one or more spikes via a given feedback connection.

When the current time slot corresponds to a layer output communication slot, the method may proceed to operation 614 where the output $y^{out}$ is communicated to a destination. In one or more implementations, the output $y^{out}$ may comprise control output comprising communication of one or more spikes via a given feed forward connection.

FIG. 7 illustrates a method 700 of using the error feedback by a neuron of a spiking network, in accordance with one or more implementations.

At operation 702, an error feedback is decoded using a property of one or more spikes received from a subsequent layer neuron. The decoding may comprise spike latency and/or binary decoding e.g. as described with respect to FIGS. 4A-4B. The error feedback may be determined using, e.g., Eqn. 5

At operation 704, a measured discrepancy associated with the error feedback is determined. In one or more implementations, the discrepancy measure may correspond to an error $e^x$ of the preceding layer neuron associated with an output of a subsequent layer neuron, e.g., as described above with respect to operation 604 of method 600. In some embodiments, the discrepancy measure $e^x$ may be determined using Eqn. 10.

At operation 706, the efficacy of feed forward connection(s) into the neuron may be adjusted. In one or more implementations, the efficacy update may be based on the measured discrepancy and a cached input delivered via respective connection(s) (e.g., using Eqn. 7).

At operation 708, the efficacy of feedback connection(s) into the neuron are adjusted. In one or more implementations, the update may be based on the measured discrepancy and a neuron output delivered via the respective connection(s) (e.g., using Eqn. 11).

At operation 710, the neuron excitability is determined based on the updated input connection efficacy $w^x$ and an input. In one or more implementation, the excitability may be determined using Eqn. 13.

Apparatus—

Figure 8:
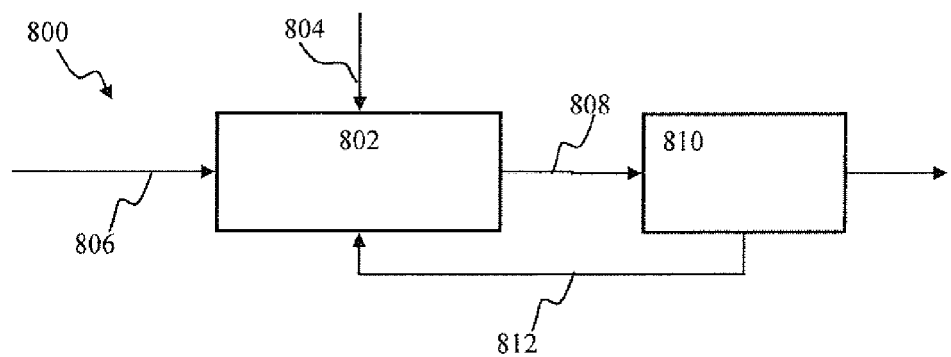
FIG. 8 is a block diagram illustrating an adaptive controller apparatus comprising a spiking neuron network configured for backwards error propagation, according to one or more implementations.

Error back propagation methodology described herein may be utilized for implementing adaptive controllers of robotic devices. FIG. 8 illustrates one implementation of an adaptive robotic apparatus 800 comprising the adaptive controller 802 and a plant (e.g., robotic platform) 810. The controller 802 may be configured to generate control output 808 for the robotic platform 810. The output 808 may comprise one or more motor commands (e.g., pan camera to the right), sensor acquisition parameters (e.g., use high resolution camera mode), commands to the wheels, arms, and/or other actuators on the robot, and/or other parameters. The output 808 may be configured by the controller 802 based on one or more sensory inputs 806. The input 806 may comprise data used for solving a particular control task. In one or more implementations, such as those involving a robotic arm or autonomous robot, the signal 806 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as that involving object recognition, the signal 806 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 806 may comprise a target motion trajectory. The motion trajectory may be used to predict a future state of the robot on the basis of a current state and the target state. In one or more implementations, the signals in FIG. 8 may be encoded as spikes.

The controller 802 may be operable in accordance with a learning process (e.g., reinforcement learning and/or supervised learning). In one or more implementations, the controller 802 may optimize performance (e.g., performance of the system 800 of FIG. 8) by minimizing average value of a performance function as described in detail commonly owned U.S. patent application Ser. No. 13/487,533, filed Jun. 4, 2012 and entitled "SYSTEMS AND APPARATUS FOR IMPLEMENTING TASK-SPECIFIC LEARNING SPIKING NEURONS", incorporated herein by reference in its entirety.

The adaptive controller 802 may comprise a parallel network comprising multiple interconnected neurons. Individual neurons may be operable independent from one another thereby enabling parallel computations. Neurons may communicate with one another within network using a variety of methods. In some implementations, the neurons may comprise rate-based process and data may be encoded into a scalar and/or a vector neuron output. In one or more implementations, the network (e.g., of the adaptive controller 802) may comprise spiking neurons.

Figure 9:
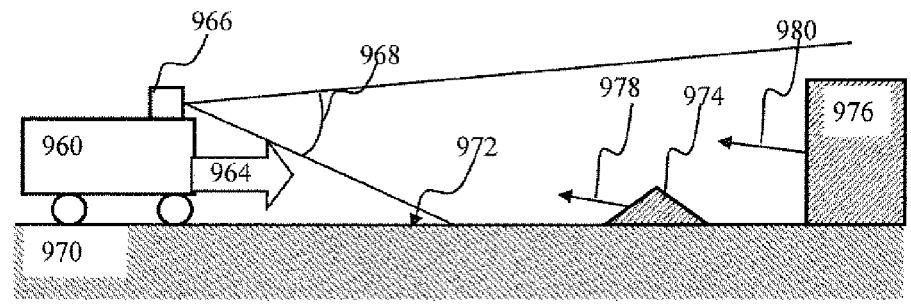
FIG. 9 is a graphical illustration depicting robotic apparatus comprising an adaptive controller apparatus of the disclosure configured for obstacle avoidance using backwards error propagation, in accordance with one or more implementations.

FIG. 9 depicts a mobile robotic apparatus that may be configured with an adaptive controller in accord with the one or more implementations illustrated in FIG. 8, supra. The robotic apparatus 960 may comprise a camera 966. The camera 966 may be characterized by a field of view 968. The camera 966 may provide information associated with objects within the field-of-view. In some implementations, the camera 966 may provide frames of pixels of luminance, refreshed at 25 Hz frame rate. However, it will be appreciated that, in some implementations, other frame rates may be used (whether regular or aperiodic).

One or more objects (e.g., a floor 970, a stationary object 974 and a moving object 976) may be present in the camera field of view. The motion of the objects may result in a displacement of pixels representing the objects within successive frames, such as described in commonly owned U.S. patent application Ser. No. 13/689,717, entitled "APPARATUS AND METHODS FOR OBJECT DETECTION VIA OPTICAL FLOW CANCELLATION", filed Nov. 29, 2012, incorporated herein by reference in its entirety.

Figure 10:
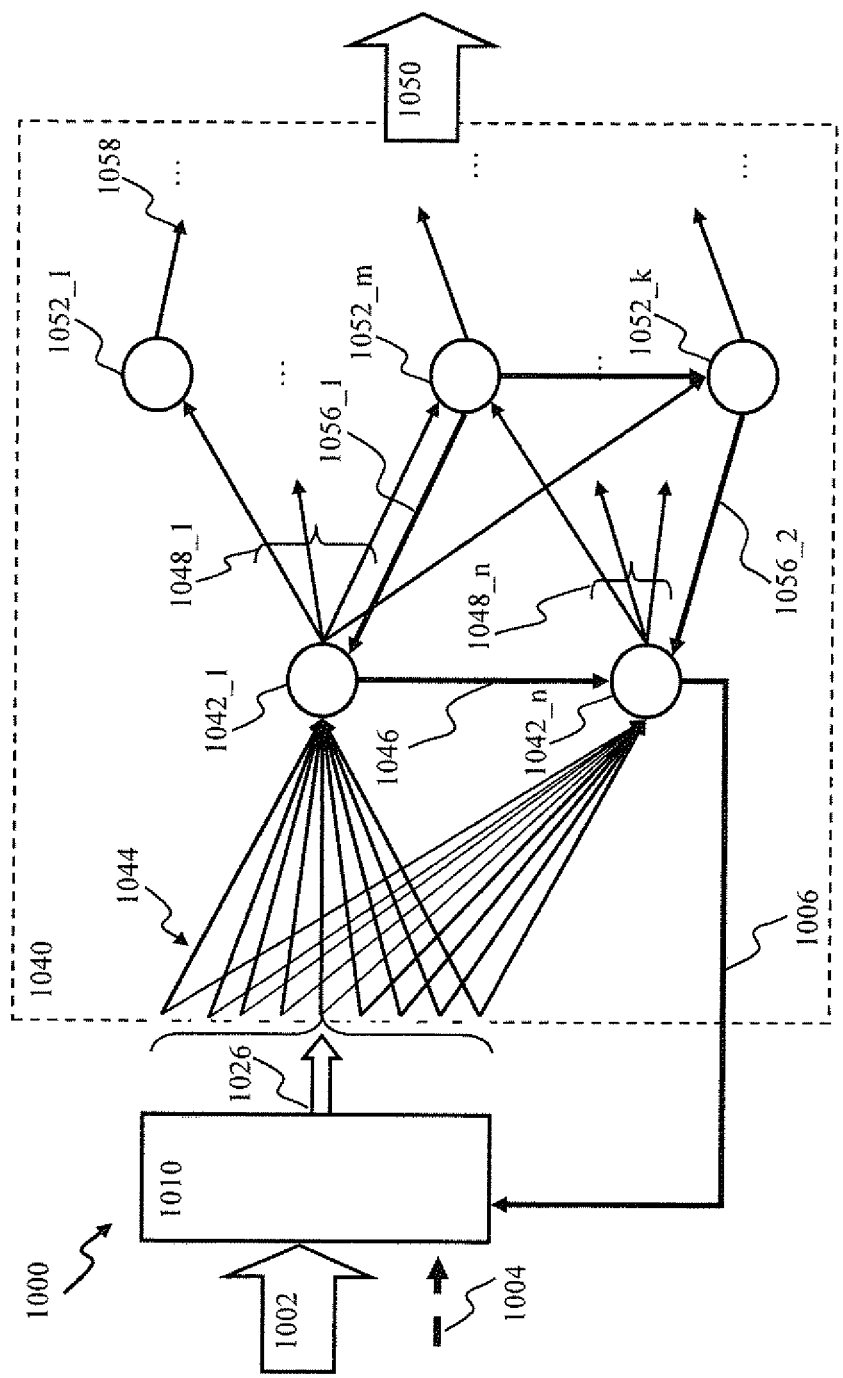
FIG. 10 is a block diagram illustrating a processing apparatus useful with an adaptive controller of a robotic device of, e.g., FIG. 9, in accordance with one or more implementations.

When the robotic apparatus 960 is in motion, such as shown by arrow 964 in FIG. 10, the optical flow estimated from the image data may comprise the self-motion component and the object motion component. By way of a non-limiting example, the optical flow measured by the rover of FIG. 9 may comprise one or more of (i) self-motion components of the stationary object 978 and the boundary (e.g., the component 972 associated with the floor boundary); (ii) component 980 associated with the moving objects 976 that comprises a superposition of the optical flow components due to the object displacement and displacement of the robotic apparatus, and/or other components.

One approach to object recognition and/or obstacle avoidance may comprise processing of optical flow using a spiking neural network apparatus comprising for example the self-motion cancellation mechanism, such as described, for example, in commonly owned U.S. patent application Ser. No. 13/689,717, entitled "APPARATUS AND METHODS FOR OBJECT DETECTION VIA OPTICAL FLOW CANCELLATION", filed Nov. 29, 2012, the foregoing being incorporated herein by reference in its entirety.

FIG. 10 illustrates a processing apparatus configured to implement object recognition and/or obstacle avoidance and useful with an adaptive controller of a robotic device of FIG. 9. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates (whether regular or aperiodic) are equally useful with the present disclosure. The apparatus 1000 may be embodied in, for example, an autonomous robotic device, e.g., the device 960 of FIG. 9.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004. One or more of the spiking neurons of the block 1010 may be configured to encode input 1002 into optical flow, as described in commonly owned U.S. patent application Ser. No. 13/689,717, entitled "APPARATUS AND METHODS FOR OBJECT DETECTION VIA OPTICAL FLOW CANCELLATION", filed Nov. 29, 2012, the foregoing being incorporated herein by reference in its entirety.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the one or more implementations represented by FIG. 10, individual detectors of the same hierarchical layer may be denoted by a "_n" designator, such that e.g., the designator 1042_1 denotes the first detector of the layer 1042. Although only two detectors (1042_1, 1042_n) are shown in FIG. 10 for clarity, it will be appreciated that the encoder may be coupled to any number of detector nodes that is compatible with the detection apparatus hardware and software limitations. Furthermore, a single detector node may be coupled to any practical number of encoders.

In various implementations, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in commonly owned, co-pending U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 10, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned, co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In such implementations, individual subsequent layers of detectors may be configured to receive signals (e.g., via connections 1058) from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with appropriate conduction delays to the detectors 1052. In some implementations, the detector cascade shown in FIG. 10 may contain any practical number of detector nodes and detector banks determined, inter alia, by the software/hardware resources of the detection apparatus and complexity of the objects being detected.

The exemplary sensory processing apparatus 1000 illustrated in FIG. 10 may further comprise one or more lateral connections 1046, configured to provide information about activity of neighboring neurons to one another.

In some implementations, the apparatus 1000 may comprise feedback connections 1006, 1056, configured to communicate context information from detectors within one hierarchy layer to previous layers, as illustrated by the feedback connections 1056_1, 1056_2 in FIG. 10. In some implementations, the feedback connection 1006 may be configured to provide feedback to the encoder 1010 thereby facilitating sensory input encoding, as described in detail in commonly owned, co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety.

Output 1050 of the processing apparatus 1000 may be provided via one or more connections 1058.

Various exemplary computerized apparatus configured to operate a spiking neuron network configured to implement error back propagation methodology set forth herein are now described with respect to FIGS. 11A-11D.

Figure 11A:
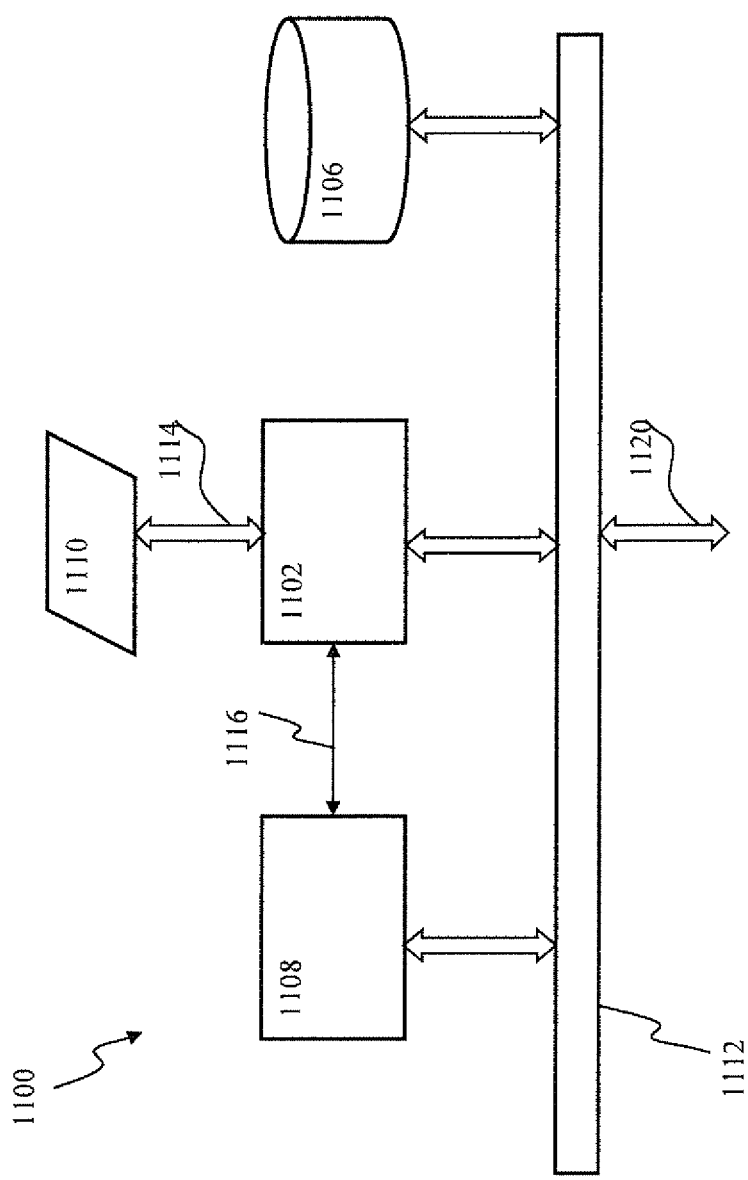
FIG. 11A is a block diagram illustrating a computerized system useful for, inter alia, operating a parallel network configured using backwards error propagation methodology, in accordance with one or more implementations.

A computerized neuromorphic processing system, consistent with one or more implementations, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100. e.g. One such implementation may comprise a central processing apparatus coupled to one or more remote camera devices providing sensory input to the pre-processing block (e.g., described with respect to operation 314 in FIG. 3).

The system 1100 further may comprise a random access memory (RAM) 1108, configured to store neuronal states and connection parameters and to facilitate synaptic updates. In some implementations, synaptic updates may be performed according to the description provided in, for example, in commonly owned, co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety. In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the disclosure including, for example, an LCD/LED monitor, touch-screen input and display device, speech input device, stylus, light pen, trackball, and/or other devices.

Figure 11B:
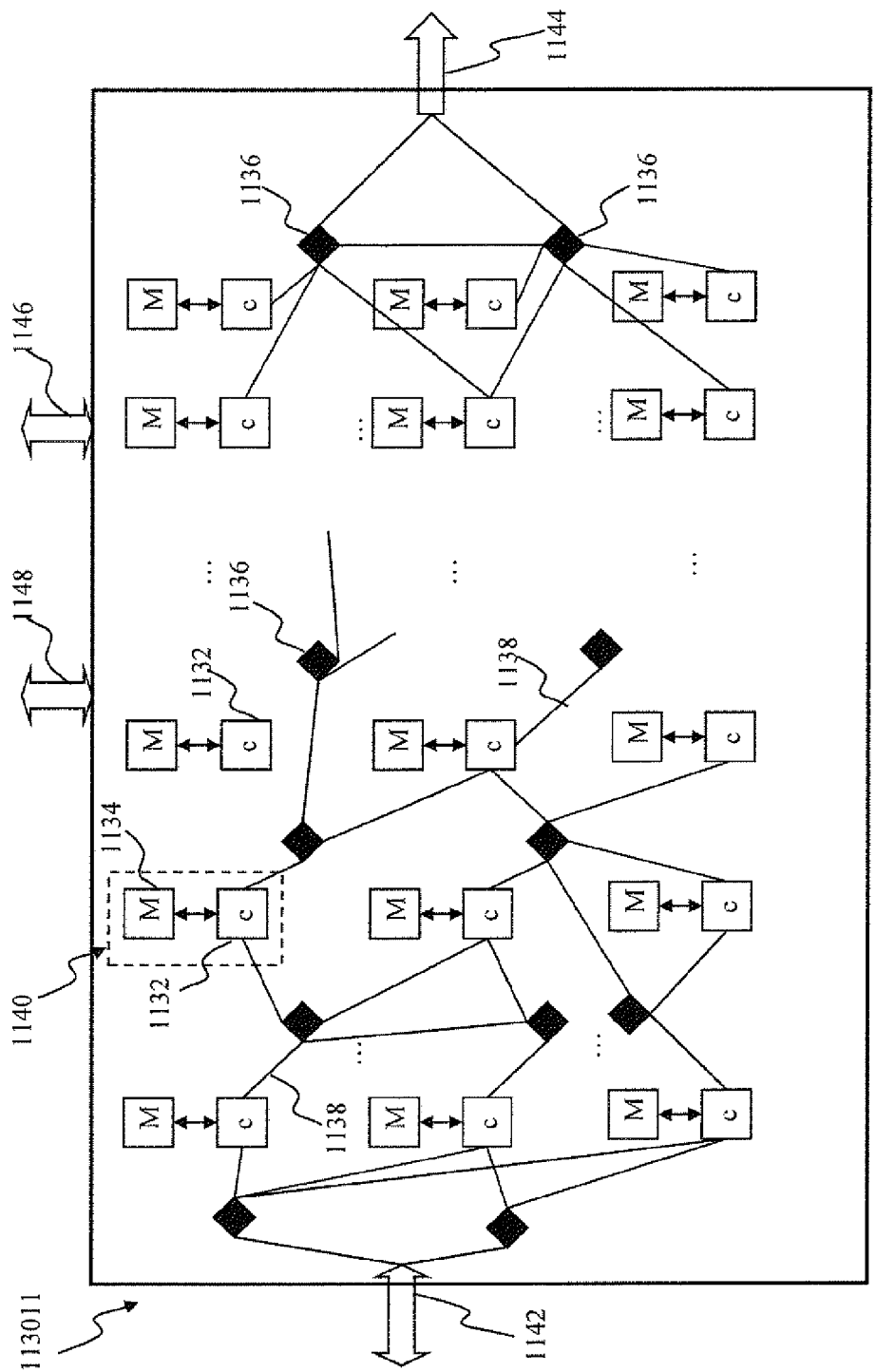
FIG. 11B is a block diagram illustrating a cell-type neuromorphic computerized system useful with, biter alia, backwards error propagation methodology of the disclosure, in accordance with one or more implementations.

Referring now to FIG. 11B, one implementation of neuromorphic computerized system configured to implement classification mechanism using a spiking network is described in detail. The neuromorphie processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in commonly owned, co-pending U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 11C:
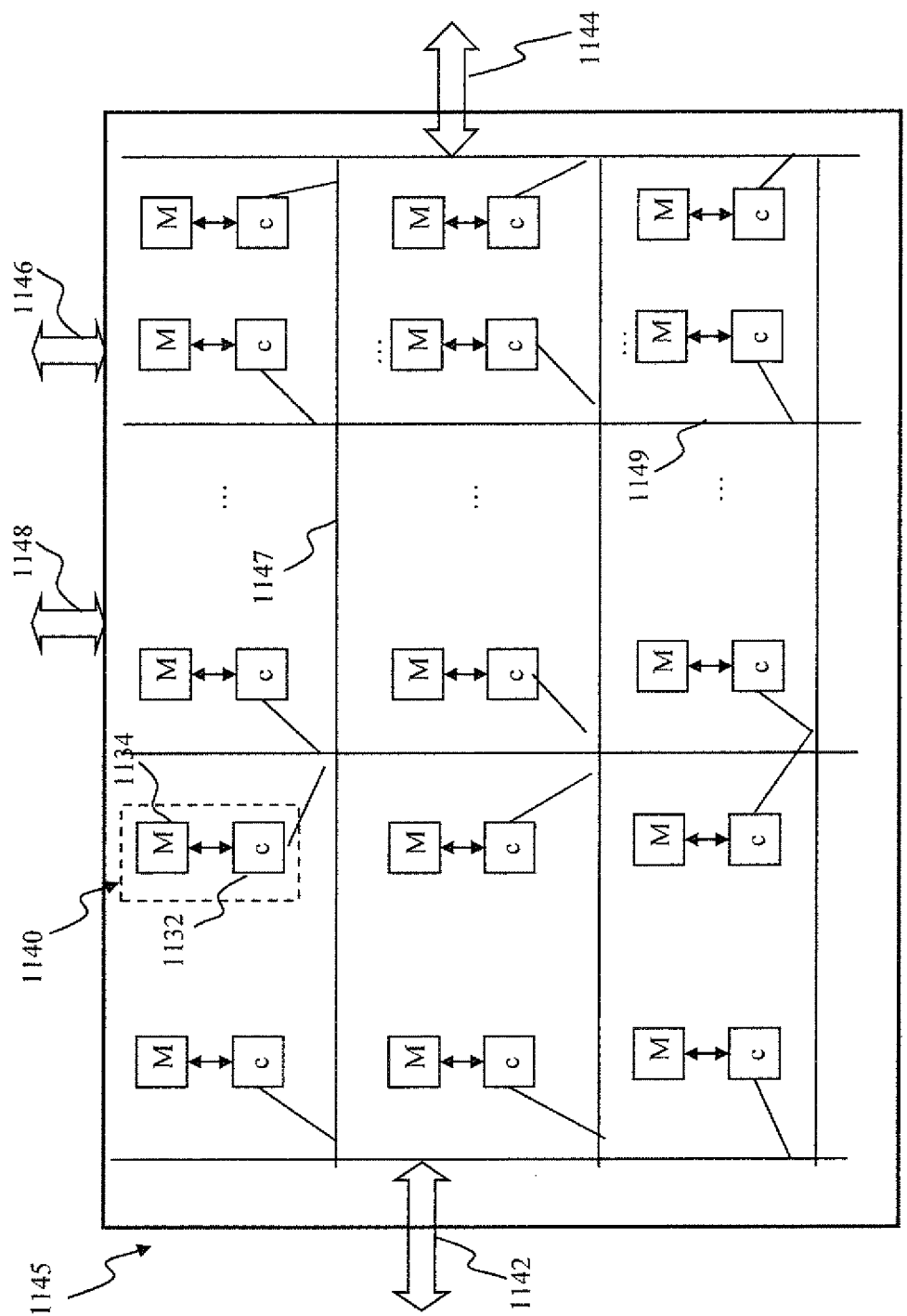
FIG. 11C is a block diagram illustrating a hierarchical neuromorphic computerized system architecture useful with, inter alia, backwards error propagation methodology, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
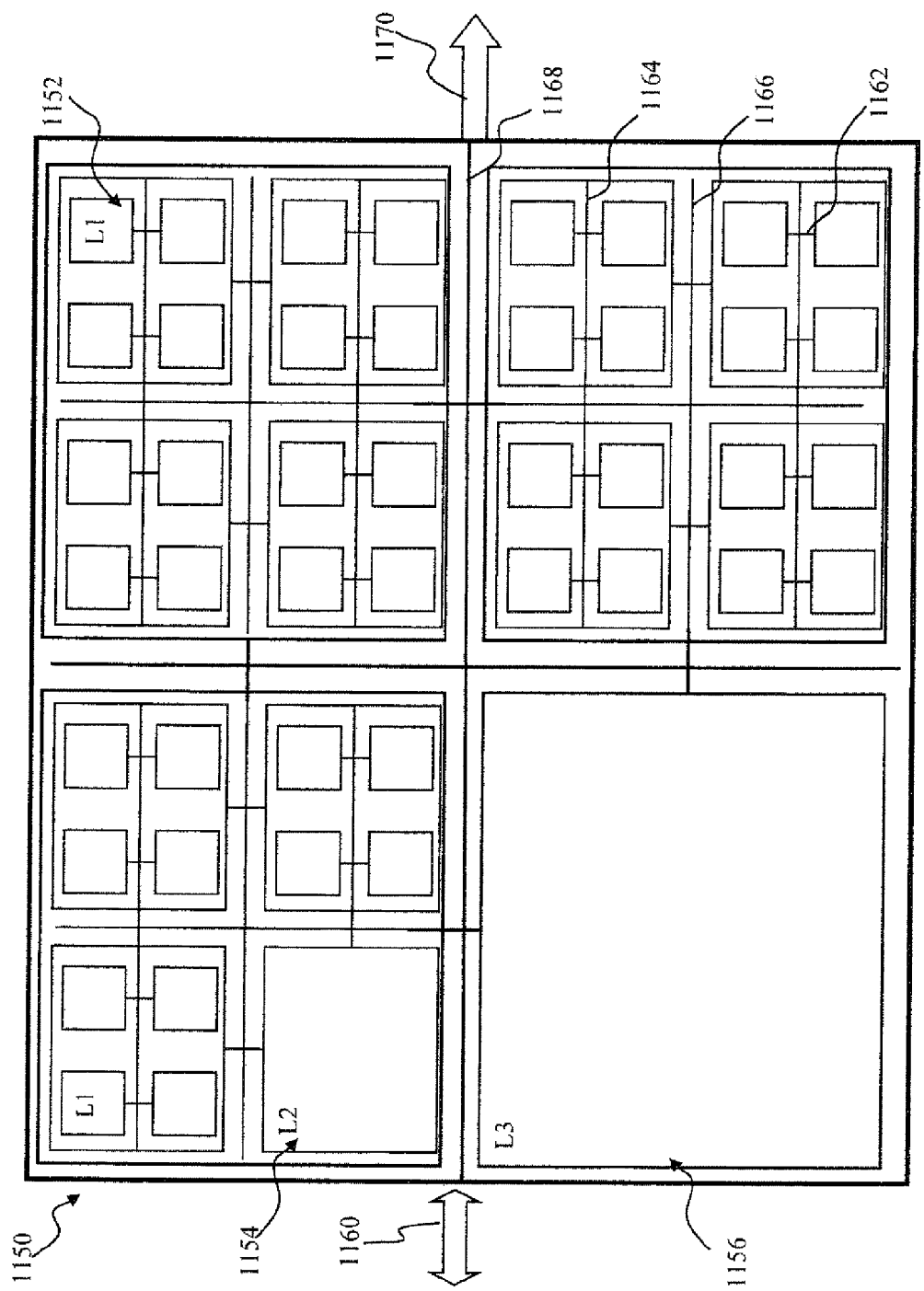
FIG. 11D is a block diagram illustrating cell-type neuromorphic computerized system architecture useful with, inter cilia, backwards error propagation methodology, in accordance with one or more implementations.

FIG. 11D illustrates one implementation of cell-based neuromorphic computerized system architecture configured to implemented backwards error propagation in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11d. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in commonly owned, co-pending U.S. patent application Ser. No. 13/487,576, entitled "DYNAMICALLY RECONFIGURABLE STOCHASTIC LEARNING APPARATUS AND METHODS", incorporated herein by reference in its entirety.

In one or more implementations, one or more portions of the apparatus 1150 may be configured to operate one or more learning rules, as described for example in commonly owned, co-pending U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

The methodology for backwards error propagation in parallel networks set forth herein may advantageously be utilized in various applications, including, e.g., classification and/or regression.

In some implementations, a spiking network comprising backwards error propagation may be configured to perform one or more of the following classification tasks:
perform visual classification of object types;
detect obstacles (is this an obstacle or not); perform speech commands classification (has the trainer pronounced word 'go' or not);
train a binary controller/decision maker (e.g., when a robot may determine as to whether to enter through a door or not);
predict binary event from the context (when the context is present, will an event occur or not?); and/or
perform general binary function approximation (compute a Boolean function of the input).

In one or more implementations of a spiking network comprising backwards error propagation, the network may be configured to one or more of the following regression tasks:

analyze a representation object in order to measure a parameter associated with the object (distance to the object, object temperature);

train a controller with float-number output (determine amount of torque from visual input);

predict a value of a function from the context (if I'm in the state X, what is the value of RL value function, so that I can find control policy with RL algorithm), prediction of Q function from Q-learning (given state X, compute value of every action I can take. I will compare them and choose the best one).; predict an analog value from visual context (if I see this object, how much more time I'm going to see it);

predict an analog values from one or more analog values (forward model) (here are 6 angles state of my arm and 4 control torques, what will be values of 6 angles in the next step);

perform general function approximation (compute log (sqrt(x+5)) which was not known in advance and is possible to compute with a two layer network); and/or predict state parameter of a robotic device (if I see robotic arm extending horizontally, what is the torque it will produce).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the invention. The scope of the disclosure should be determined with reference to the claims.

What is claimed is:

1. A method of communicating feedback from one layer to an other layer of a multilayer spiking neuron network, the method comprising:
    determining the feedback based at least on an output from the one layer and a teaching input into the one layer;
    encoding the feedback into a spike latency of a first spike and a second spike;
    communicating the first and the second spikes to the other layer;
    based on the first spike and the second spike, determining an error associated with an output of the other layer; and
    adjusting an efficacy of an input connection into the other layer based on an input to the other layer and the error;
    wherein the encoding further comprises a binary encoding comprising the step of determining a latency of the first spike based at least on a first bit value associated with the feedback, and a latency of the second spike based at least on a second bit value associated with the feedback.

2. The method of claim 1, further comprising:
    configuring the output of the one layer based on the output of the other layer and an efficacy of at least one connection between the one layer and the other layer; and
    determining the output of the other layer based at least on the input to the other layer and the efficacy of the at least one connection between the one layer and the other layer.

3. The method of claim 2, further comprising:
    configuring the input to the other layer to communicate information related to one or more objects; and
    configuring the teaching input to indicate a target object;
    wherein the output of the one layer is indicative of an occurrence of the target object within the one or more objects.

4. The method of claim 3, further comprising:
    adjusting the efficacy of the at least one connection between the one and other layers based on the output of the other layer and the feedback.

5. The method of claim 4, wherein the communicating the first and second spikes to the other layer comprises communicating via a feedback connection; and
    the method further comprises adjusting the efficacy of the feedback connection based on the output of the other layer and the feedback.

6. The method of claim 5, wherein:
    the other layer comprises a first spiking neuron;
    the one layer comprises a second spiking neuron;
    the adjusting the efficacy of the at least one connection between the one layer and the other layer comprises adjusting based on an event associated with the second neuron; and
    the adjusting the efficacy of the feedback connection comprises adjusting based on an event associated with the first neuron.

7. The method of claim 6, further comprising:
    determining the output of the one layer based on a sigmoid operation on a combination of the output of the other layer and the efficacy of the at least one connection between the one and the other layers; and
    the determining the output of the other layer comprises determining based on a sigmoid operation on a combination of the input to the other layer and the efficacy of the input connection.

8. The method of claim 1, wherein the encoding further comprises an encoding selected from the group consisting of linear encoding and logarithmic encoding.

9. The method of claim 1, wherein the encoding further comprises a hybrid encoding configured to determine the latency of the first spike based at least on a first function of the feedback, and the latency of the second spike based at least on a second function of the feedback.

10. The method of claim 1, further comprising:
    communicating at least one spike payload information comprising a plurality of bits; and
    encoding the feedback into the plurality of bits.

11. The method of claim 1, further comprising encoding the feedback into a number of spikes within a plurality of spikes
    wherein the feedback comprises a real number characterized by two or more bits.

12. An apparatus comprising a non-transitory computer-readable storage medium comprising a plurality of instructions configured to, when executed by a processor, cause the apparatus to:
  determine a feedback based at least on an output from one layer and a teaching input into the one layer;
  encode the feedback into a property of at least one spike;
  communicate the at least one spike to an other layer;
  based on the at least one spike, determine an error associated with an output of the other layer; and
  adjust an efficacy of an input connection into the other layer based on an input to the other layer and the error;
  wherein:
  the at least one spike is configured to communicate payload information comprising a plurality of bits; and
  the feedback is encoded into the plurality of bits.

13. The apparatus of claim 12, wherein:
  the output of the one layer is determined based on the output of the other layer and an efficacy of at least one connection between the one layer and the other layer; and
  the output of the other layer is determined based at least on the input to the other layer and the efficacy.

14. The apparatus of claim 13, wherein:
  the input to the other layer is configured to communicate information related to one or more objects;
  the teaching input is configured to indicate a target object; and
  the output of the one layer is indicative of an occurrence of the target object within the one or more objects.

15. The apparatus of claim 14, wherein the plurality of instructions are further configured, when executed by the processor, to cause the apparatus to:
  adjust the efficacy of the at least one connection between the one and another layers based on the output of the other layer and the feedback.

16. The apparatus of claim 15, wherein:
  the at least one spike is communicated from the one layer to the other layer via a feedback connection; and
  the efficacy of the feedback connection is configured to be adjusted based on the output of the another layer and the feedback.

17. The apparatus of claim 16, wherein:
  the other layer comprises a first spiking neuron;
  the one layer comprises a second spiking neuron;
  the adjustment of the efficacy of the at least one connection between the one layer and the other layer is based on an event associated with the second neuron; and
  the adjustment of the efficacy of the feedback connection is configured based on an event associated with the first neuron.

18. The apparatus of claim 17, wherein:
  the determination of the output of the one layer is configured based on a sigmoid operation on a combination of the output of the other layer and the efficacy of the at least one connection between the one and the other layers; and
  the determination of the output of the other layer is configured based on a sigmoid operation on a combination of the input to the other layer and the efficacy of the input connection.

19. The apparatus of claim 12, wherein:
  the property comprises a spike latency; and
  the encoding of the feedback is selected from the group consisting of linear encoding and logarithmic encoding.

20. The apparatus of claim 12, wherein:
  the at least one spike comprises a first and a second spike;
  the property comprises a spike latency; and
  the encoding of the feedback comprises a binary encoding configured to determine a latency of the first spike based at least on a first bit value associated with the feedback, and a latency of the second spike based at least on a second bit value associated with the feedback.

21. The apparatus of claim 12, wherein:
  the at least one spike comprises a first and a second spike;
  the property comprises a spike latency; and
  the encoding of the feedback comprises a hybrid encoding configured to determine a latency of the first spike based at least on a first function of the feedback, and a latency of the second spike based at least on a second function of the feedback.

22. The apparatus of claim 12, wherein:
  the feedback comprises a real number characterized by two or more bits;
  the at least one spike comprises a plurality of spikes; and
  the property comprises a number of spikes within the plurality of spikes.

23. A controller apparatus useful for controlling a robot, the apparatus comprising:
  a first plurality of spiking neurons configured to receive, via a plurality of input connections, a sensory input associated with an environment of the robot, and to provide a signal conveying information about an object within the environment;
  a second plurality of spiking neurons configured to determine a control output based at least on the signal; and
  one or more output connections configured to provide the control output for the robot;
  wherein the second plurality of neurons is configured to:
    determine an error measure based at least on the control output and the teaching input;
    communicate the error measure to the first plurality of neurons via a feedback interface, the feedback interface being configured to share access to the neuron with the one or more output connections;
    the second plurality of neurons is configured to be updated at a plurality of iterations;
    the control output and communication of the error measure by the second plurality of neurons are configured as a time multiplex characterized by at least:
      a first portion of the plurality of iterations being configured to provide the control output to the robot; and
      a second portion of the plurality of iterations being configured to communicate the feedback to the first plurality of neurons.

24. The apparatus of claim 23, wherein individual iterations within the first portion and the second portion of the plurality of iterations are arranged in an alternating order.

25. The apparatus of claim 24, wherein:
  individual iterations within one of the first portion or the second portion of the plurality of iterations comprise even iterations; and
  individual iterations within the other one of the first portion or the second portion of the plurality of iterations comprise odd iterations.

26. The apparatus of claim 23, wherein:
  individual neurons of the first plurality of spiking neurons are operably coupled to one or more individual neurons of the second plurality of spiking neurons via a plurality of feed forward and a plurality of feedback connections;

individual ones of the plurality of feed forward connections are configured to communicate the signal from the first plurality of spiking neurons to the second plurality of spiking neurons;

individual ones of the plurality of feedback connections are configured to communicate the error measure from the second plurality of spiking neurons to the first plurality of spiking neurons;

individual ones of the plurality of feed forward connections are characterized by a feed-forward efficacy, the feed forward efficacy of a given feed forward connection configured to be adjusted based at least on the error measure and a portion of the signal communicated via the given feed forward connection;

individual ones of the plurality of feedback connections are characterized by a feedback efficacy; and the feedback efficacy of a given feedback connection is configured to be adjusted based at least on the error measure and a portion of the signal communicated via the given feed-forward connection to a given neuron of the second plurality of neurons.

27. The apparatus of claim 26, wherein:

individual ones of the plurality of input connections are characterized by an input efficacy, the input efficacy of a given input connection configured to be adjusted based on a discrepancy measure and a portion of the sensory input communicated via the given input connection to a given neuron of the first plurality of neurons; and the discrepancy measure is determined based at least on the feedback received by the given neuron of the first plurality of neurons and the feedback efficacy of the given feedback connection.

28. The apparatus of claim 27, wherein:

the connectivity between the individual neurons of the first plurality of spiking neurons and the individual neurons of the second plurality of spiking neurons is selected from the group consisting of: (i) all-to-all, (ii) all-to-one, and (iii) some-to-some mapping.

29. The apparatus of claim 28, wherein:

the input efficacy of the given input connection is configured to advance or delay generation of a portion of the signal by the given neuron of the first plurality of neurons; and the feed-forward efficacy of the given feed forward connection is configured to advance or delay generation of a portion of the control output by the given neuron of the second plurality of neurons.

30. The apparatus of claim 27, wherein:

the error measure communicated via the given feedback connection is configured to be determined by the given neuron of the second plurality of neurons;

the feedback efficacy of the given feedback connection is configured to be adjusted by the given neuron of the first plurality of neurons; and the discrepancy measure determination is effectuated by the given neuron of the first plurality of neurons.

* * * * *